United States Patent
Kitazawa

(10) Patent No.: US 7,233,398 B2
(45) Date of Patent: Jun. 19, 2007

(54) COLORIMETER MEASURED VALUE CONTROL SYSTEM AND COLORIMETER MEASURED VALUE CONTROL METHOD THEREOF, AND A COLOR CONTROL INFORMATION PROVIDING SYSTEM AND A COLOR CONTROL INFORMATION PROVIDING METHOD THEREOF

(75) Inventor: Shigeyuki Kitazawa, Kawaguchi (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 300 days.

(21) Appl. No.: 10/851,753

(22) Filed: May 20, 2004

(65) Prior Publication Data

US 2004/0239935 A1  Dec. 2, 2004

(30) Foreign Application Priority Data

May 29, 2003 (JP) ............................. 2003-152188
Sep. 30, 2003 (JP) ............................. 2003-340008

(51) Int. Cl.
G01J 3/46 (2006.01)
G06F 15/00 (2006.01)
G06K 1/00 (2006.01)

(52) U.S. Cl. ...................................... 356/402; 358/1.9
(58) Field of Classification Search ................ 356/402, 356/319, 406; 358/1.9, 504; 345/600, 601; 347/19; 382/167; 399/49
See application file for complete search history.

(56) References Cited

U.S. PATENT DOCUMENTS 3,970,392 A * 7/1976 Figueroa et al. ............ 356/408
4,813,000 A * 3/1989 Wyman et al. ............. 382/165
5,363,197 A * 11/1994 Ohno et al. ................. 356/405
5,568,266 A * 10/1996 Ciza et al. .................. 356/402
5,900,860 A * 5/1999 Ueda ........................... 345/600
5,917,541 A * 6/1999 Nakagome et al. ........... 348/93
6,522,977 B2 * 2/2003 Corrigan et al. .............. 702/32
6,804,025 B1 * 10/2004 Nishihara et al. ............ 358/1.9
6,853,464 B1 * 2/2005 Ueda et al. ................. 358/1.9
6,959,111 B2 * 10/2005 Hirayama et al. .......... 382/167
6,975,426 B2 * 12/2005 Kuno et al. ................. 358/1.2
2003/0053134 A1 * 3/2003 Haro .......................... 358/2.1
2003/0095274 A1 * 5/2003 Hagai et al. ................. 358/1.9
2004/0190022 A1 * 9/2004 Kiyohara .................... 358/1.9

FOREIGN PATENT DOCUMENTS

JP    06-281501    10/1994
JP    11-132849    5/1999

* cited by examiner

Primary Examiner—Layla G. Lauchman
Assistant Examiner—J. Underwood
(74) Attorney, Agent, or Firm—Frishauf, Holtz, Goodman & Chick, P.C.

(57) ABSTRACT

A colorimeter measured value control system for controlling the measured values of plural colorimeters, including: a plurality of terminal apparatuses, each arranged for each base, having transmission section for transmitting the measured values of a color sample measured by each colorimeter; and a control server having: a storage section for storing measured values of the color sample measured by a standard colorimeter as standard values; a reception section for receiving the measured values; a determining section for determining the correction formula for approximating the measured values to the standard values stored; and a registration section for registering the correction formula, as the correction formula for correcting the error of the measured values of the colorimeter.

38 Claims, 13 Drawing Sheets

FIG. 11

SCREEN FOR MEASUREMENT OF COLOR CHART FOR CORRECTION 10A

MEASURED VALUE DISPLAY

| NUMBER | C% | M% | Y% | K% | L* | a* | b* |
|---|---|---|---|---|---|---|---|
| 1 | 100 | 0 | 0 | 0 | 52.074 | -29.583 | -50.123 |
| 2 | 0 | 100 | 0 | 0 | 46.669 | 71.060 | -6.323 |
| 3 | 0 | 0 | 100 | 0 | 87.211 | -4.354 | 85.459 |
| 4 | 0 | 0 | 0 | 100 | 13.767 | 5.939 | -3.305 |
| 5 | 100 | 100 | 0 | 0 | 11.649 | 7.534 | -3.100 |
| 6 | 0 | 100 | 100 | 0 | 46.282 | 64.018 | 47.850 |
| 7 | 100 | 0 | 100 | 0 | 45.094 | -63.659 | 21.237 |
| 8 | 100 | 100 | 100 | 0 | 20.381 | 26.976 | -49.978 |
| 9 | 0 | 0 | 0 | 0 | 92.608 | 0.442 | -2.397 |
| 10 | 50 | 0 | 0 | 0 | 73.970 | -15.768 | -25.291 |
| 11 | 0 | 50 | 50 | 0 | 68.542 | 37.491 | -6.795 |

10Aa

COMMENT
2002.05.16

MEASURED VALUE INFORMATION

10Ab

DISPLAY SWITCHING | AUTO MEASUREMENT··· | STOP···
SELECTION··· | TRANSMISSION | CLOSE···

FIG. 13

| | WITHOUT AREA DIVISION | | 2 DIVIDED AREAS IN a* AREA | | 4 DIVIDED AREAS IN a* b* AREA | |
|---|---|---|---|---|---|---|
| | AVERAGE ΔE | MAX ΔE | AVERAGE ΔE | MAX ΔE | AVERAGE ΔE | MAX ΔE |
| FACTOR OF 3 x 3 MATRIX | 0.264 | 1.373 | 0.195 | 0.807 | 0.193 | 0.821 |
| FACTOR OF 3 x 3 MATRIX (WITH INTERCEPT) | 0.268 | 1.469 | 0.172 | 0.777 | 0.166 | 0.791 |
| FACTOR FOR LINEAR FUNCTION | 0.342 | 0.920 | 0.233 | 0.940 | 0.299 | 0.777 |
| FACTOR FOR LINEAR FUNCTION (WITH INTERCEPT) | 0.286 | 0.780 | 0.218 | 0.865 | 0.268 | 1.321 |

COLORIMETER MEASURED VALUE CONTROL SYSTEM AND COLORIMETER MEASURED VALUE CONTROL METHOD THEREOF, AND A COLOR CONTROL INFORMATION PROVIDING SYSTEM AND A COLOR CONTROL INFORMATION PROVIDING METHOD THEREOF

BACKGROUND OF THE INVENTION

The present invention relates to:

a colorimeter measured value control system with colorimeter measured value control method thereof capable of:

detecting the errors of the measured values of a plurality of colorimeters arranged for each base; and deriving a correction formula for correcting these errors, thereby controlling the measured values of a plurality of above-mentioned colorimeters; and a color control information providing system with color control information providing method thereof capable of:

detecting the errors of the measured values of a plurality of colorimeters arranged on each of the aforementioned bases in order to calibrate a plurality of image outputting apparatus arranged for each base, wherein the aforementioned colorimeters are used to measure the output produced from the aforementioned image outputting apparatus;

deriving a correction formula for correcting these errors;

correcting the measured values, measured by the aforementioned colorimeter, of the output produced from the aforementioned image outputting apparatus, using the correction formula;

calculating the errors, among the aforementioned bases, of the measured values measured by the aforementioned colorimeters, of the output produced from the aforementioned image outputting apparatus, based on the corrected measured values; and providing the results of the aforementioned calculation as color control information.

CONVENTIONAL TECHNOLOGY

For example, in an outputting apparatus such as a color proof creation apparatus for outputting a color proof to confirm the finish of a printed piece in advance, outputting apparatuses installed at a plurality of remote bases for color proofing of the outputted color proof are required to produce the same outputs.

In such a case, calibration of these outputting apparatuses is essential to ensure the same color and density of the outputs produced by the outputting apparatuses of various bases.

To put it more specifically, in this case, the color and density of the outputs produced from outputting apparatuses (e.g. values L*, a* and b* in the CIE L*a*b* color system, or tristimulus values X, Y and Z in the XYZ color system) are measured by a colorimeter (e.g. color difference meter) in each base. Based on the measured value, the outputting apparatuses are adjusted so that the color and density of the output will be approximated to the standard values.

A different colorimeter is commonly used in each base. Thus, when manufacturers or the models of the colorimeters are different, for example, the measured values are not always the same, depending on the differences in makes and models. Even if the manufacturers or the models of the colorimeters are the same, the measured values are not always the same due to the difference in each individual. This has created a problem in conventional art.

To solve this problem, various proposals have been made to correct the measured values among a plurality of colorimeters.

For example, an color value correction apparatus described in the Official Gazette of Japanese Patent Tokkai 1994-281501 is provided with color value correction means consisting of a neural network to get the color values of a colorimeter, wherein spectral distribution is analyzed by this correction means to provide corrections on the spectral level and to adjust the measured values among different colorimeters (see Patent Document 1, for example).

For example, according to the technique (see Patent Document 2) proposed in the colorimetric value correction method and colorimeter described in the Official Gazette of Japanese Patent Tokkai 1999-132849, a color value is the calorimetric value consisting of three elements, and a quadratic correction formula is formed from the difference of the calorimetric value from these standard values for each element. When the calorimetric value is corrected for each element using this correction formula, the appropriate correction formula for each element can be used to get high-precision correction.

[Patent Document 1] Official Gazette of Japanese Patent Tokkai 1994-281501 (Paragraphs [0011]-[0036], and FIGS. 1 through 5)

[Patent Document 2] Official Gazette of Japanese Patent Tokkai 1999-132849 (Paragraph [0015]-[0050] and FIGS. 1 through 5)

PROBLEMS TO BE SOLVED BY THE INVENTION

However, the following problems are encountered in those techniques: In the former art, a complication calculation is made using a neutral network, which requires use of a high-performance large-sized computer. Further, this involves burdensome work in learning and others. In the latter art, when the colorimeters of the same model are used at various bases, high-precision correction of the difference in measured values resulting from the difference in each individual cannot be ensured by the aforementioned quadratic correction formula for each element.

Under these situations, even if the color and density of the output produced from the outputting apparatus are measured by a colorimeter at each base, and the outputting apparatus is adjusted based on the measured values, adequate color control of these outputting apparatuses has been difficult since the difference of measured values of the colorimeter at each base is not corrected appropriately.

In view of the prior art described above, it is an object of the present invention to provide a colorimeter measured value control system with colorimeter measured value control method thereof comprising the steps of:

detecting the errors of the measured values of a plurality of colorimeters arranged for each base; and deriving a correction formula for correcting these errors, thereby properly controlling the measured values of a plurality of above-mentioned colorimeters; and a color control information providing system with color control information providing method thereof comprising the steps of:

detecting the errors of the measured values of a plurality of colorimeters arranged on each of the aforementioned bases in order to calibrate a plurality of image outputting apparatus arranged for each base, wherein the aforementioned colorimeters are used to measure the output produced from the aforementioned image outputting apparatus;

deriving a correction formula for correcting these errors;

correcting the measured values, measured by the aforementioned colorimeter, of the output produced from the aforementioned image outputting apparatus, using the correction formula;

calculating the errors, among the aforementioned bases, of the measured values measured by the aforementioned colorimeters, of the output produced from the aforementioned image outputting apparatus, based on the corrected measured values; and providing the results of the aforementioned calculation as color control information; thereby ensuring adequate calibration of a plurality of image outputting apparatuses arranged for each base.

SUMMARY OF THE INVENTION

The aforementioned problems can be solved by the present invention having the following features:

(1) A colorimeter measured value control system comprising the steps of:

detecting the errors of the measured values of a plurality of colorimeters arranged for each base; and deriving a correction formula for correcting these errors, thereby controlling the measured values of a plurality of above-mentioned colorimeters;

this colorimeter measured value control system comprising:

a plurality of terminal apparatuses, arranged for each base, each having a color sample measured value transmission section for transmitting the measured value of a color sample measured by the aforementioned colorimeter; and a control server further comprising:

a color sample measured value storage section for storing the measured value of the aforementioned color sample measured by the standard colorimeter, in advance as a standard value;

a color sample measured value reception section for receiving the measured value sent from the color sample measured value transmission section;

a determining section for determining the correction formula to perform corrections of approximating the measured value received by the color sample measured value reception section, to the standard value stored in the color sample measured value storage section; and a correction formula registration section for registering the correction formula determined by the determining section, as the correction formula for correcting the error of the measured value of the colorimeter having measured the value received by the color sample measured value reception section.

(2) A colorimeter measured value control method comprising the steps of:

detecting the errors of the measured values of a plurality of colorimeters arranged for each base; and deriving a correction formula for correcting these errors, thereby controlling the measured values of a plurality of above-mentioned colorimeters. This colorimeter measured value control method contains:

a color sample measured value storage step for storing the measured value of the color sample measured by the standard colorimeter, as the standard value in advance, by the control server for controlling the measured values of a plurality of the aforementioned colorimeters;

a color sample measured value transmission step for transmitting the measured value of the color sample measured by the colorimeter, in each of a plurality of the aforementioned terminal apparatuses;

a color sample measured value reception step for reception the measured value sent in the color sample measured value transmission step, by the control server;

a determining step for determining the correction formula to perform corrections of approximating the measured value received in the color sample measured value reception step, to the standard value stored in the color sample measured value storage step; and a correction formula registration step for registering the correction formula determined in the determining step, as the correction formula for correcting the error of the measured value of the colorimeter having measured the value received in the color sample measured value reception step.

(3) A color control information providing system comprising the steps of:

detecting the errors of the measured values of a plurality of colorimeters arranged on each of the aforementioned bases in order to calibrate a plurality of image outputting apparatus arranged for each base, wherein the aforementioned colorimeters are used to measure the output produced from the aforementioned image outputting apparatus;

deriving a correction formula for correcting these errors;

correcting the measured values, measured by the aforementioned colorimeter, of the output produced from the aforementioned image outputting apparatus, using the correction formula;

calculating the errors, among the aforementioned bases, of the measured values measured by the aforementioned colorimeters, of the output produced from the aforementioned image outputting apparatus, based on the corrected measured values; and providing the results of the aforementioned calculation. This color control information providing system contains:

a plurality of terminal apparatuses, arranged for each base, each having;

a measured value transmission section for transmitting the measured value of the output measured by the colorimeter; and for transmitting the measured value of a color sample measured by the aforementioned colorimeter; and a control server further comprising:

a measured value storage section for storing the measured value of the output measured by the standard colorimeter, in advance as a standard value and for storing the measured value of the aforementioned color sample measured by the standard colorimeter, in advance as a standard value;

a measured value reception section for receiving the measured value transmitted from the output measured value transmission section and for receiving the measured value sent from the color sample measured value transmission section;

a determining section for determining the correction formula to perform corrections of approximating the measured value received by the color sample measured value reception section, to the standard value stored in the color sample measured value storage section;

a correction formula registration section for registering the correction formula determined by the determining section, as the correction formula for correcting the error of the measured value of the colorimeter having measured the value received by the color sample measured value reception section;

a calculation section for calculating the difference between the measured value received by the output measured value reception section, corrected by the correction formula registered by the correction formula registration section, and the standard value stored in the output measured value storage section; and an error registration section for registering the error calculated by the calculation section, as an error, among various bases, of the measured values measured by the colorimeter of the output as an object of the measured value received by the output measured value reception section.

(4) A color control information providing method comprising the steps of:

detecting the errors of the measured values of a plurality of colorimeters arranged on each of the aforementioned bases in order to calibrate a plurality of image outputting apparatus arranged for each base, wherein the aforementioned colorimeters are used to measure the output produced from the aforementioned image outputting apparatus;

deriving a correction formula for correcting these errors;

correcting the measured values, measured by the aforementioned colorimeter, of the output produced from the aforementioned image outputting apparatus, using the correction formula;

calculating the errors, among the aforementioned bases, of the measured values measured by the aforementioned colorimeters, of the output produced from the aforementioned image outputting apparatus, based on the corrected measured values; and providing the results of the aforementioned calculation. This color control information providing method contains:

an output measured value storage step for storing the measured value of the output measured by the standard colorimeter, as a standard value in advance, by a control server for providing errors, among the aforementioned various bases, of the measured values measured by the colorimeter;

a color sample measured value storage step for storing the measured value of the color sample measured by the standard colorimeter, as the standard value in advance, a color sample measured value transmission step for transmitting the measured value of the color sample measured by the colorimeter, in each of a plurality of the aforementioned terminal apparatuses;

a color sample measured value reception step for receiving the measured value sent in the color sample measured value transmission step, by the control server;

a determining step for determining the correction formula to perform corrections of approximating the measured value received in the color sample measured value reception step, to the standard value stored in the color sample measured value storage step; and a correction formula registration step for registering the correction formula determined in the determining step, as the correction formula for correcting the error of the measured value of the colorimeter having measured the value received in the color sample measured value reception step;

an output measured value transmission step for transmitting the measured value of the output measured by the colorimeter in each of a plurality of the aforementioned terminal apparatuses;

an output measured value reception step for receiving the measured value transmitted in the output measured value transmission step in the aforementioned control server;

a calculation step for calculating the difference between the measured value received in the output measured value reception step, corrected according to the correction formula registered in the aforementioned correction formula registration step, and the standard value stored in the aforementioned output measured value storage step; and an error registration step for registering the error calculated by the calculation section, as an error, among various bases, of the measured values measured by the colorimeter of the output as an object of the measured value received in the output measured value reception step.

(5) A colorimeter measured value control system that, based on the difference of the measured values of a plurality of colorimeters for measuring the outputs produced from an image output apparatus arranged for each of the aforementioned base, with respect to the standard value, derives a correction formula for correcting the aforementioned difference, in order to perform color control of a plurality of the aforementioned image outputting apparatuses installed in various bases. This colorimeter measured value control system comprises:

a plurality of terminal apparatuses, arranged for each base, each having a color sample measured value transmission section for transmitting the measured value in a predetermined color system at a plurality of measuring points of the color sample measured by the aforementioned colorimeter; and a control server further comprising:

a color sample measured value storage section for storing the measured value in a predetermined color system at a plurality of measuring points of the aforementioned color sample measured by the standard colorimeter, in advance as a standard value;

a color sample measured value reception section for receiving the measured value in a predetermined color system at a plurality of measuring points of the aforementioned color sample sent from the color sample measured value transmission section;

a correction formula derivation section for deriving a plurality of correction formulas to classify the received measured values for each of the areas, where the color space in the aforementioned predetermined color system is divided into a plurality of areas, and to perform corrections of approximating the aforementioned measured value to the aforementioned stored standard value for each of the aforementioned classified measured values;

a determining section wherein the measured value is corrected according to a plurality of the previously derived correction formulas, for each of the aforementioned classified measured values, and, based on the measured value corrected according to a plurality of the correction formulas, the correction formula having the highest correction precision is determined by selection from among a plurality of the derived correction formulas; and a correction formula registration section for registering the correction formula determined above, as a correction formula for correcting the aforementioned errors, for each of the above classified measured values.

To solve the aforementioned problems, the invention of claim 6 provides a colorimeter measured value control method that, based on the difference of the measured values of a plurality of colorimeters for measuring the outputs produced from an image output apparatus arranged for each of the aforementioned base, with respect to the standard value, derives a correction formula for correcting the aforementioned difference, in order to perform color control of a plurality of the aforementioned image outputting apparatuses installed in various bases. This colorimeter measured value control system is characterized in that a plurality of terminal apparatuses arranged at each of the aforementioned bases comprises:

a color sample measured value transmission step for transmitting the measured value in a predetermined color system at a plurality of measuring points of the color sample measured by the aforementioned colorimeter;

a color sample measured value storage step for storing the measured value in a predetermined color system at a plurality of points of the color sample measured by the standard colorimeter, as the aforementioned standard value in advance, in a control server connected with a plurality of the aforementioned terminal apparatuses via the Internet;

an output measured value reception step for receiving the measured value in a predetermined color system at a plurality of measuring points of the sample transmitted in the color measured value transmission step;

a correction formula derivation step for deriving a plurality of correction formulas to classify the received measured values for each of the areas, wherein the aforementioned predetermined color system is classified into a plurality of areas, and to perform corrections of approximating the aforementioned measured value to the aforementioned stored standard value for each of the aforementioned classified measured values;

a determining step wherein the measured value is corrected according to a plurality of the previously derived correction formulas, for each of the aforementioned classified measured values, and, based on the measured value corrected according to a plurality of the correction formulas, the correction formula having the highest correction precision is determined by selection from among a plurality of the derived correction formulas; and a correction formula registration step for registering the correction formula determined above, as a correction formula for correcting the aforementioned errors, for each of the above classified measured values.

BRIEF DESCRIPTION OF THE DRAWINGS

FIG. 11 is a block diagram representing the configuration of the color chart measurement screen for correction displayed in the display section of the terminal apparatus in the color control system shown in FIG. 1;

FIG. 13 is an explanatory diagram representing the process of producing the color difference, maximum color difference and average color difference between the standard values and the measured values of the color and density in the predetermined color system at each measuring point of the color chart for colorimeter correction by the corrected colorimeter, for each of the divided pattern in the control server calculation section shown in FIG. 1.

DETAILED DESCRIPTION OF THE PREFERRED EMBODIMENT

Figure 1:
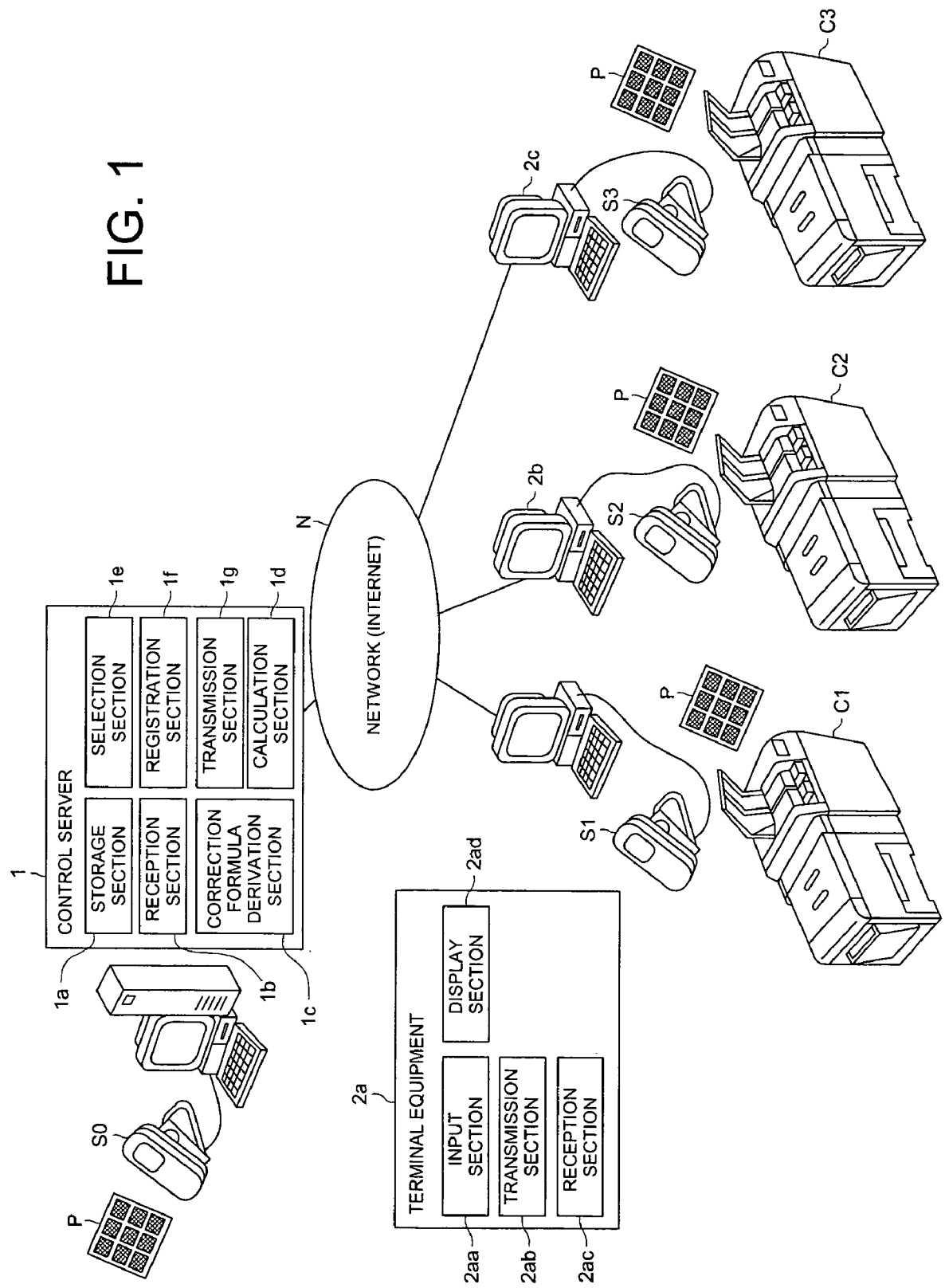
FIG. 1 is an explanatory diagram representing the configuration of a color control information providing system of the present invention.

Referring to the drawings, the following describes preferred embodiments of the colorimeter measured value control system, colorimeter measured value control method thereof, color control information providing system and color control information providing method thereof according to the present invention:

The color control information providing system and color control information providing method thereof according to the present invention contain the colorimeter measured value control system and colorimeter measured value control method thereof. Accordingly, the following describes the color control information providing system and color control information providing method thereof.

[Configuration of Color Control Information Providing System]

The configuration of the color control information providing system will be described with reference to the drawings.

(Schematic Configuration of the Color Control Information Providing System)

FIG. 1 shows the configuration of the color control information providing system. As shown in FIG. 1, this color control information providing system contains:

a control server 1 comprising:

a step of controlling the difference in measured values among colorimeters S1 through S3 for measuring the color and density of the output produced from the outputting apparatuses C1 through C3 installed for each of a plurality of remote bases; to put it in greater details, a step of controlling the difference between the measured values provided by the colorimeters S1 through S3 and the measured values provided by the standard colorimeter S0;

a step of deriving the correction formula for correcting the difference;

a step of using this correction formula to correct the measured values, provided by the colorimeters S1 through S3, of the output produced from the outputting apparatuses C1 through C3;

a step of calculating the differences, among the outputting apparatuses C1 through C3, of the measured values, provided by the colorimeters S1 through S3, of the output produced from the outputting apparatuses C1 through C3, based on the corrected measured value; and a step of providing the result of this calculation as color control information; and a plurality of terminal apparatuses 2a through 2c, arranged in response to each of the colorimeters S1 through S3, for transmitting the measured values of the colorimeters S1 through S3 to the control server 1, and for receiving information on the difference, among outputting apparatuses C1 through C3, of the measured values, provided by the colorimeters S1 through S3, of the output produced from the aforementioned outputting apparatuses C1 through C3.

The terminal apparatuses 2a through 2c can be arranged in any number conforming to the number of the colorimeters S1 through S3. It is possible to use the outputting apparatuses C1 through C3 and colorimeters S1 through S3 of different makes or different models. The outputting apparatuses C1 through C3 include a color proof creation apparatus, as well as a printer, copying machine and other outputting apparatus where the color and density can be adjusted.

(Detailed Configuration of Control Server)

The following describes the detailed configuration of the control server 1. The control server 1 is what is called a computer terminal and contains a display section such as a monitor, an input section such as a keyboard and mouse, and a main apparatus including a server. Further, this main apparatus contains:

a storage section 1a for storing the measured value of the color and density in the predetermined color system at each measuring point of color chart for colorimeter correction (corresponding to the "color sample" of the present invention) P measured by the standard colorimeter S0, as a standard value in advance;

a reception section 1b for receiving the measured values of the color and density of the output (corresponding to "output" of the present invention) produced from the outputting apparatuses C1 through C3, provided by the colorimeters S1 through S3 transmitted from the terminal apparatuses 2a through 2c, and the measured values of the color and density of the color and density in the predetermined color system at each measuring point of color chart for colorimeter correction P;

a correction formula derivation section 1c for deriving a plurality of correction formulas to classify the measured values of the color and density in the predetermined color system at each measuring point of the color chart for colorimeter correction, provided by the colorimeters S1 through S3 received by this reception section 1b, for each of the areas, where the color space in the aforementioned predetermined color system is divided into a plurality of areas, and to perform corrections of approximating the aforementioned measured value to the standard value of the color and density of the color chart for colorimeter correction stored in the storage section 1a, for each of the classified measured values;

a calculation section 1d for calculating the color difference between the measured values of the color and density of the color chart for colorimeter correction P, provided by the colorimeters S1 through S3 corrected according to a plurality of correction formulas derived by the correction formula derivation section 1c, and the standard values of the color and density of the color chart for colorimeter correction P stored in the storage section 1a, for each of the aforementioned classified measured values;

a selection section 1e for selecting the correction formula having the highest correction precision from among a plurality of the derived correction formulas derived from the correction formula derivation section 1c, based on the color difference calculated by the calculation section 1d, for each of the aforementioned classified measured values;

a registration section 1f for registering the formula selected by this selection section 1e, as a correction formula for performing the correction to approximate the measured values of the color and density of the color chart for colorimeter correction P provided by the colorimeters S1 through S3 received by the reception section 1b, to the standard values of the color and density of the color chart for colorimeter correction P stored in the storage section 1a, for each of the aforementioned classified measured values; and a transmission section 1g for transmitting the information on the correction formula for each of the aforementioned classified measured values registered in this registration section if, to the terminal apparatuses 2a through 2c.

The storage section 1a is composed of the storage means such as a memory, and corresponds to the "color sample measured value storage means" and "output measured value storage means" of the present invention. Further, the reception section 1b and transmission section 1g are composed of the network interface, and correspond to the "color sample measured value reception means", "output measured value reception means", "correction formula transmission means" and "error transmission means" of the present invention, respectively. The correction formula derivation section 1c, selection section 1e, registration section if and calculation section 1d are composed of computing means such as a CPU and storage means such as a memory. The computing means such as a CPU executes the specified computation program stored in the storage means such as a memory, whereby processing to be described later is carried out. They correspond to "correction formula derivation means", "selection means", "correction formula registration means", "error registration means" and "calculation means" of the present invention. Incidentally, the "determining means" of the present invention is composed of the correction formula derivation section 1c and selection section 1e.

(Configuration of Color Chart for Calorimeter Correction-1)

Figure 2A:
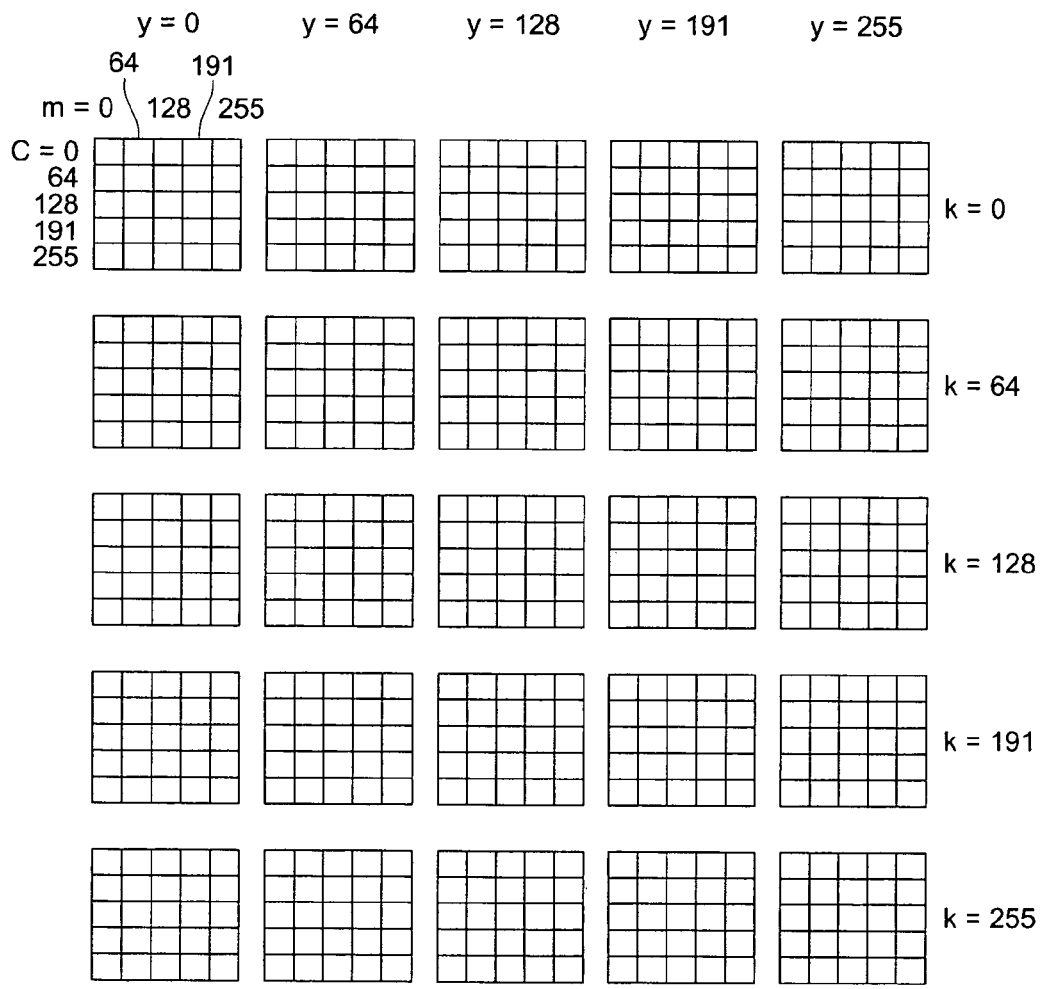
FIGS. 2(a) and (b) are explanatory diagrams representing the configuration of a color chart for colorimeter correction.

The following describes the configuration of the aforementioned color chart for colorimeter correction P: The color chart for colorimeter correction P corresponds to the "color sample" of the present invention. To put it more specifically, as shown in FIG. 2(a), four colors C, M, Y and K superimposed in multiple gradations are arranged in regular configuration, and they constitute a plurality of measuring points. To be more specific, in the standard colorimeter S0 and colorimeters S1 through S3, the similar measuring points are measured in the similar order of measurement. Incidentally, the numerals for C, M, Y and K shown in this figure indicate the gradation values when each color is divided into 255 gradations. It is preferred that the color chart for colorimeter correction P be created by a hot melt high-end DDCP (short for Direct Digital Color Proof;

a system for direct high-precision outputting of digital data to a printer) of less time-based color fluctuation.

(Configuration of Color Chart for Calorimeter Correction-2)

Figure 2B:
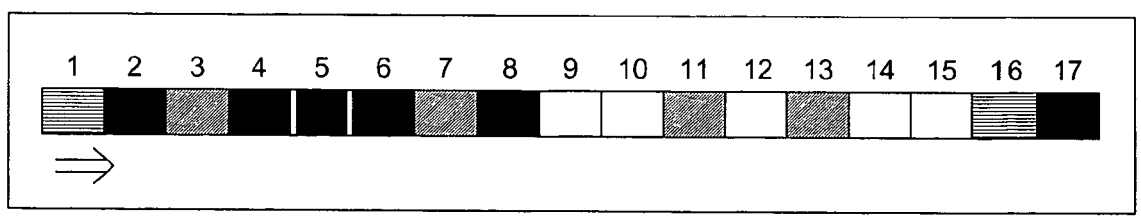

As shown in FIG. 2(b), colors covering the areas of the color space in the predetermined color system, such as C100%, M100%, Y100%, K100%, CMY100% and MY100%, are arranged in a row. Each of them constitutes one measuring point (forming the measuring point of 17 in this figure, incidentally). To be more specific, in the standard colorimeter S0 and colorimeters S1 through S3, the similar measuring points are measured in the similar order (e.g. along the arrow mark in the figure).

(Detailed Configuration of Terminal Apparatus)

The detailed configuration of terminal apparatuses 2a through 2c will be described. Since these terminal apparatuses 2a through 2c have the same configuration, the following describes the terminal apparatus 2a.

The terminal apparatus 2a is what is called a computer terminal, and comprises:

an input section 2aa for inputting the measured values of the color and density of the target by the colorimeter S1 and the color chart for colorimeter correction P;

a transmission section 2ab for transmitting the measured value of the colorimeter S1 inputted by the input section 2aa, to the control server 1 through the network N;

a reception section 2ac for receiving the information on the correction formula having the highest correction precision and the error (error between the measured values of the color and density of the target provided by the colorimeters S1 through S3 corrected according to the correction formula, selected by the selection section 1, calculated from the calculation section 1c of the control server 1, and the standard values of the color and density of the target stored in the storage section 1a) transmitted from the transmission section 1g of the control server 1; and a display section 2ad for displaying the information on the correction formula having the highest correction precision and information on errors, received by the reception section 2ac.

The input section 2aa is composed of input means such as a keyboard and mouse. The transmission section 2ab and reception section 2ac are composed of the network interface, and correspond to the "color sample measured value transmission means", "output measured value transmission means", "correction formula reception means" and "error reception means" of the present invention. The display section 2ad consists of display means such as a monitor, and corresponds to the "correction formula display means" and "error display means".

The terminal apparatus 2a and colorimeter S1 can be connected with each other through communication means such as a communications cable.

[Color Control Method in Color Control Information Providing System—Embodiment 1]

Figure 3:
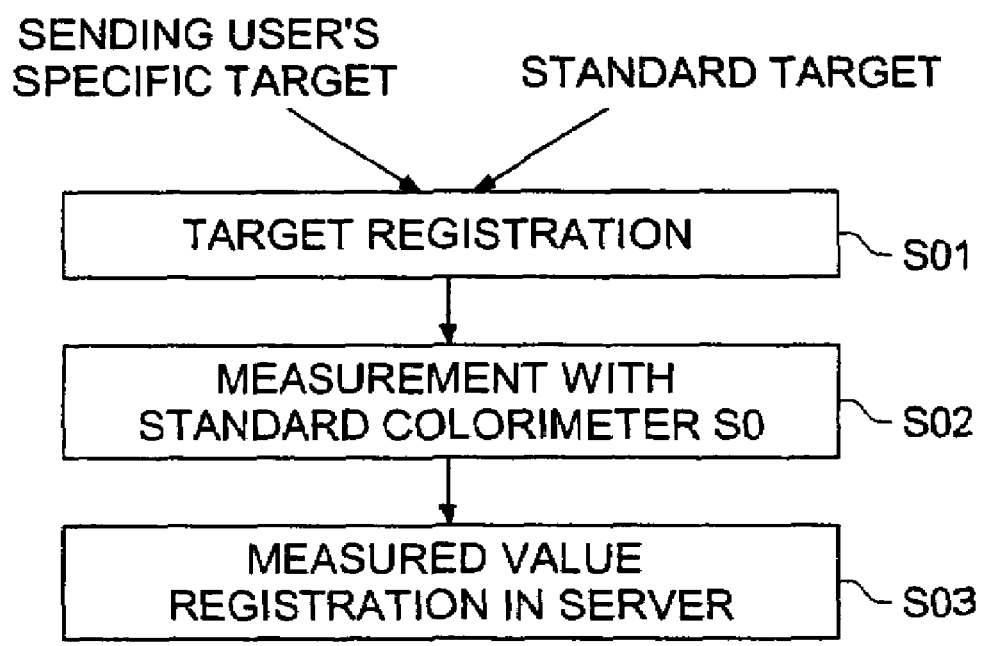
FIG. 3 is a flowchart representing registration of the target measured value provided by a standard colorimeter in a control server of a color control information providing system shown in FIG. 1.
Figure 4:
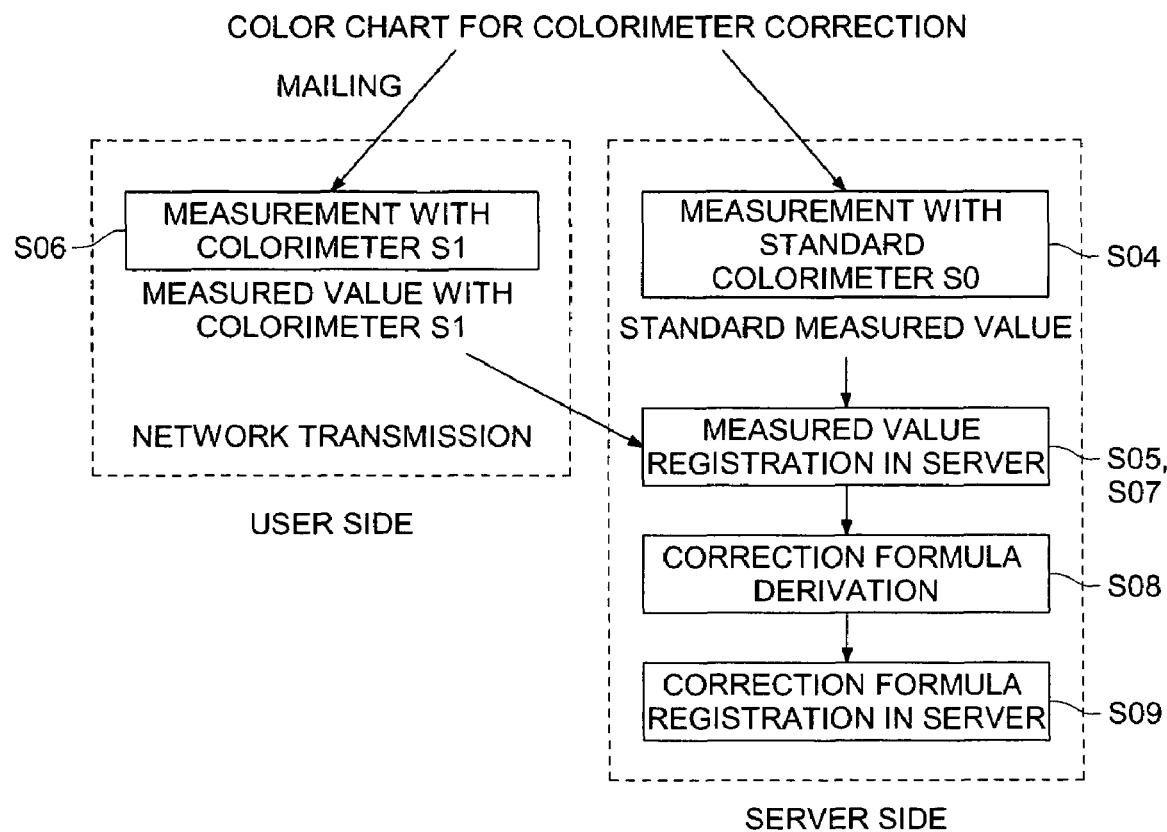
FIG. 4 is a flowchart representing the steps wherein the measured value of the color chart for colorimeter correction measured by a colorimeter arranged at one base is registered in the color control information providing system of FIG. 1; a correction formula is derived to approximate this value to the measured value of the color chart for colorimeter correction measured by the standard colorimeter; and the correction formula is registered.
Figure 7:
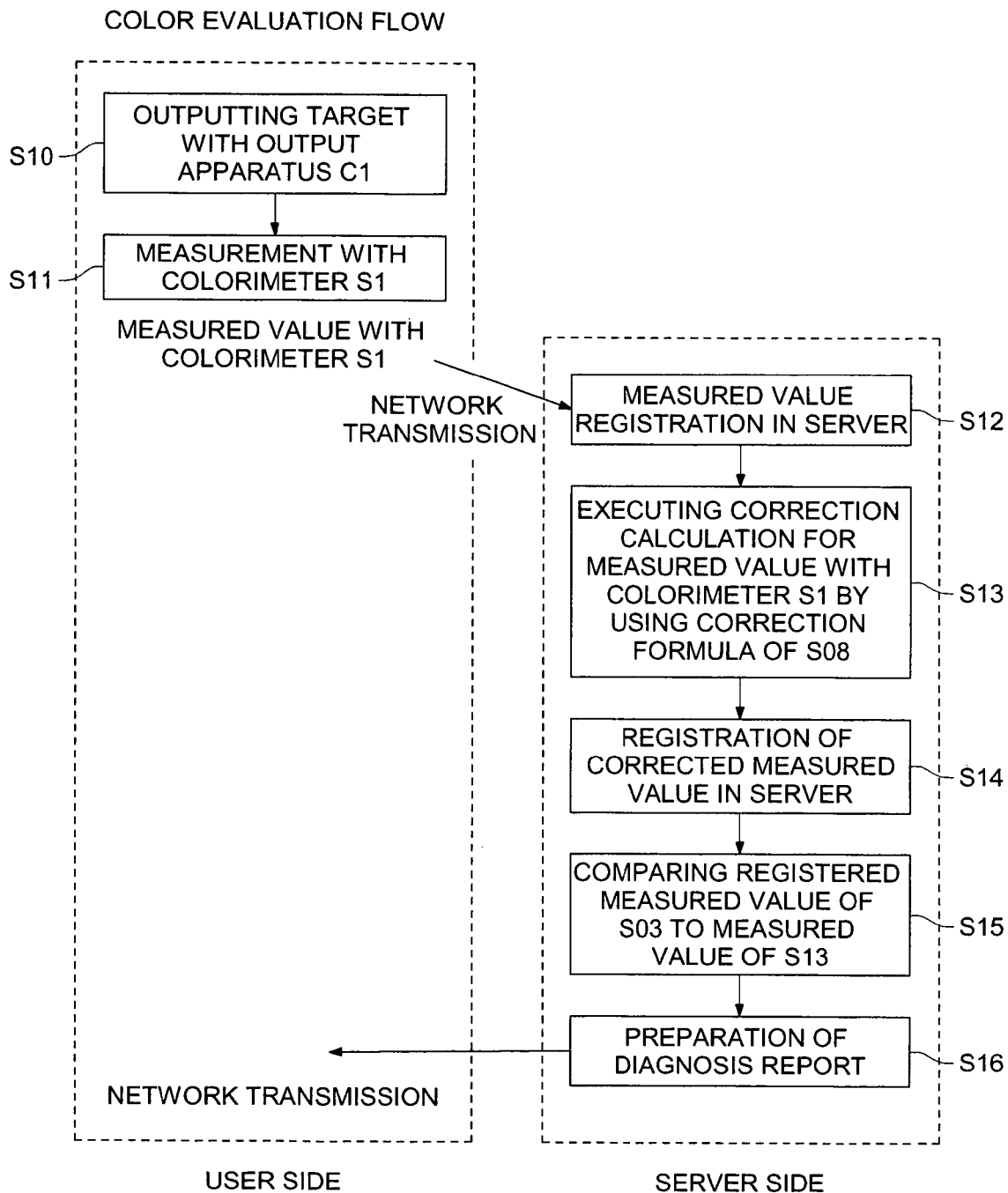
FIG. 7 is a flowchart representing registration of the target measured value provided by the colorimeters arranged at one base in a color control information providing system shown in FIG. 1; calculation of the difference of the measured value with respect to the target measured value provided by a standard colorimeter; and creation of a diagnostic data.

Referring to the flowcharts shown in FIGS. 3, 4 and 7, the following describes the color control information providing method used in the aforementioned color control information providing system. An example of correcting the measured value related to the colorimeter S1 will be described:

[Output Measured Value Storage Step]

In the first place, a target is registered by a manager in charge of overall administration of the colorimeter measured value control system, as shown in FIG. 3. To put it more specifically, the information on the position of the measuring points with respect to the target and the order of measurement are inputted by the control server 1 through input means such as a keyboard and mouse (S01). What is called "target" in the present text refers to the output of the image as a target of color tone adjustment—namely, the image printed in the printed matter—produced by the outputting apparatuses C1 through C3. This target can be the special target sent by a user for each of the outputting apparatuses C1 through C3, or the standard target prepared in advance for each of the outputting apparatuses C1 through C3.

According to the inputted information on the position of the measuring points and the order of measurement, the manager uses the standard colorimeter S0 to measure the color and density of the target (S02).

The manager uses the input means such as a keyboard and mouse of the control server 1 or the registration file storing the measured values to input the color and density of the target measured by the standard colorimeter S0, according to the inputted information on the position of the measuring points and the order of measurement. Thus, the measured values of the color and density of the target, together with the information on the position of the measuring points and the order of measurement, are stored into the storage section 1a as standard values (S03).

[Color Sample Measured Value Storage Step]

As shown in FIG. 4, the manager uses the standard colorimeter S0 to measure the color and density of the aforementioned color chart for colorimeter correction P according to the information on the position of the measuring points and the order of measurement (S04).

In the control server 1, the manager uses the input means such as a keyboard and mouse, or the registration file storing the measured values to input the measured values of the color and density of the color chart for colorimeter correction P provided by the standard colorimeter S0. In this case, however, the manager also enters the information on the position of the measuring points with respect to the color chart for colorimeter correction P and the order of measurement. In this fashion, the measured values of the color and density of the color chart for colorimeter correction P, together with the information on the position of the measuring points and the order of management, are stored in the storage section 1a as standard values (S05).

[Color Sample Measured Value Transmission Step]

A user employing the colorimeter measured value control system operates the terminal apparatus 2a to register the measured values provided by the colorimeter S1. To put it more specifically, the user accesses the control server 1 from the terminal apparatus 2a and inputs the predetermined item—specifically, information on the destination for mailing the color chart for colorimeter correction P as an object of the measurement by the colorimeter S1—(e.g. address, name and telephone number of the person as a mailing destination) and other information on the screen displayed at a predetermined site of the Web.

In the control server 1, the manager checks the predetermined items on the aforementioned screen displayed at a predetermined site of the Web, and mails the color chart for colorimeter correction P to the specified destination. In this case, information on the destination of this color chart for colorimeter correction P (e.g. address, name and telephone number of the person as a destination for return mail) is reported in writing.

Upon arrival of the color chart for colorimeter correction P, the user connects the colorimeter S1 with the terminal apparatus 2a using communication means such as a communications cable, and accesses the control server 1 from the terminal apparatus 2a. The manager downloads a predetermined measuring tool on the aforementioned screen displayed at a predetermined site of the Web. The predetermined measuring tool includes the information on the position of the measuring points and the order of measurement and the information on the destination of measured values when the color and density of the color chart for colorimeter correction P are measured by the standard colorimeter S0. This measuring tool is transmitted to the colorimeter S1 through the terminal apparatus 2a, and measures the same measuring points as those when the color and density of the color chart for colorimeter correction P are measured by the standard colorimeter S0, using the same order of measurement (S06). The information contained in this measuring tool may be reported in writing or inputted manually by the user employing the terminal apparatus 2a or colorimeter S1.

In the manner described above, when the color and density of the color chart for colorimeter correction P have been measured by the colorimeter S1, the user accesses the control server 1 from the terminal apparatus 2a, the user inputs the measured values of the colorimeter S1 by the input section 2aa on the aforementioned screen displayed at a predetermined site of the Web. In this case, it is also possible to arrange such a configuration that the measured values of the colorimeter S1 are inputted directly in the control server 1 from the colorimeter S1, without being inputted in the terminal apparatus 2a.

The user returns the color chart for colorimeter correction P to the specified destination.

[Color Sample Measured Value Reception Step]

In the control server 1, the reception section 1b receives the measured values sent from the transmission section 2ab of the terminal apparatus 2a,—measured values of the color and density of the color chart for colorimeter correction P provided by the colorimeter S1. These measured values are then stored in the storage section 1a (S07).

[Determining Step (Correction Formula Derivation Step)]

In the control server 1, based on the standard values of the color and density of the color chart for colorimeter correction P provided by the standard colorimeter S0, stored in the storage section 1a and the measured values of the color and density of the color chart for colorimeter correction P provided by the colorimeter S1, the correction formula derivation section 1c uses a plurality of types of calculation methods to derive a plurality of correction formulas for performing the correction to approximate the measured values of the color and density of the color chart for colorimeter correction P provided by the colorimeter S1, to the standard values of the color and density of the color chart for colorimeter correction P provided by the standard colorimeter S0 (S08). In this case, it is preferred in the correction formula derivation section 1c that the aforementioned correction formula be derived, after the measured value expressed, for example, in the L*a*b* color system of CIE (Commission Internationale de l'Eclairage) have been converted into the measured value that can be expressed in the XYZ (tristimulus values). This is because the color system of the XYZ (tristimulus values) allows the measured values to be expressed always in the positive values, and this feature facilitates correction of measured values. However, measured values may be calculated in the color system of the XYZ (tristimulus values), depending on the configuration of the colorimeter S1. In such cases, the aforementioned conversion need not be carried out.

(Details of Conversion Method)

The following specifically describes the details of the method for converting the measured value from the L*a*b* color system of CIE (Commission Internationale de l'Eclairage) to the XYZ (tristimulus values) color system.

Formula for conversion from L*a*b* color system to XYZ (tristimulus values) color system For example, the following relation is found between the (L, a, b) and (X, Y, Z) in the case of D50 light source (standard color temperature (5000K) of the printing industry):

$$y=(L+16.0)/116.0$$

$$x=a/500.0+y$$

$$Z=y-b/200.0$$

If xs0, ys0, zs0>0.008856

$$xs0=x^3$$

$$ys0=y^3$$

$$zs0=Z^3$$

If xs0, ys0, zs0≤0.008856

$$xs0=[x-(16.0/116.0)]/7.787$$

$$ys0=[y-(16.0/116.0)]/7.787$$

$$zs0=[z-(16.0/116.0)]/7.787$$

Substituting them into $$X=xs0\times0.98072$$

$$Y=ys0\times1.00000$$

$$Z=zs0\times1.18225$$

Then elements X, Y and Z each can be properly expressed in terms of L, a and b.

(Specific Examples of Multiple Calculation Techniques)

The following describes the specific examples of multiple calculation techniques used in the aforementioned correction formula derivation section 1c.

The correction formula derivation section 1c derives multiple correction formulas according to various calculation techniques described below, including the calculation technique disclosed in the Official Gazette of Japanese Patent Tokkai 1999-132849 (FIGS. 1 through 5, and in paragraphs [0015]-[0050]).

EXAMPLE 1

Figure 5A:
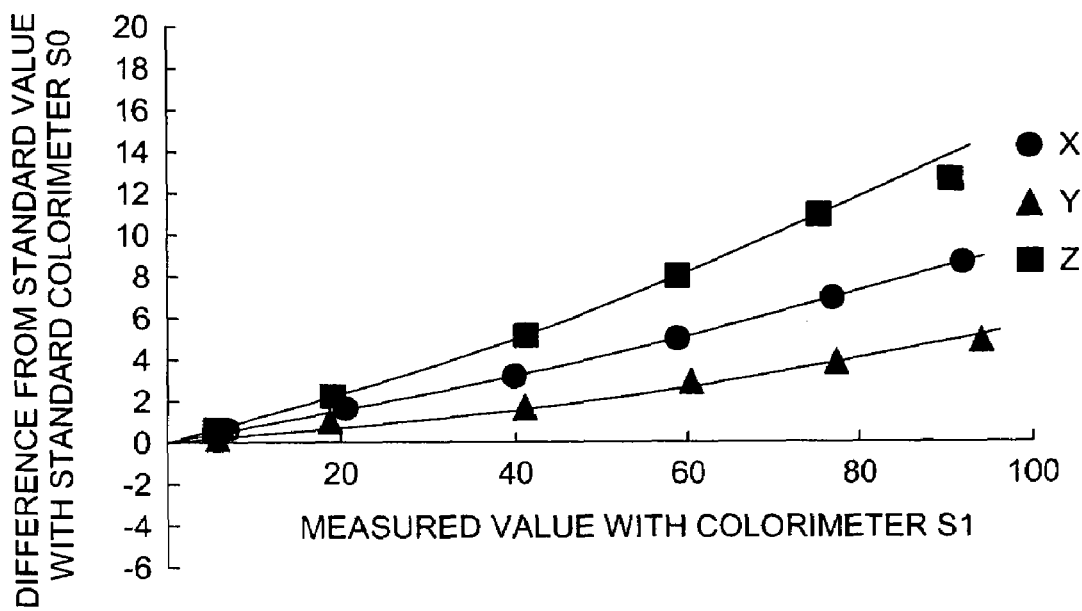
FIGS. 5(a) and (b) are explanatory diagrams representing the step of the factor of a quadratic function as the correction formula being obtained by regression analysis in the correction formula derivation section of the color control information providing system shown in FIG. 1.
Figure 5B:
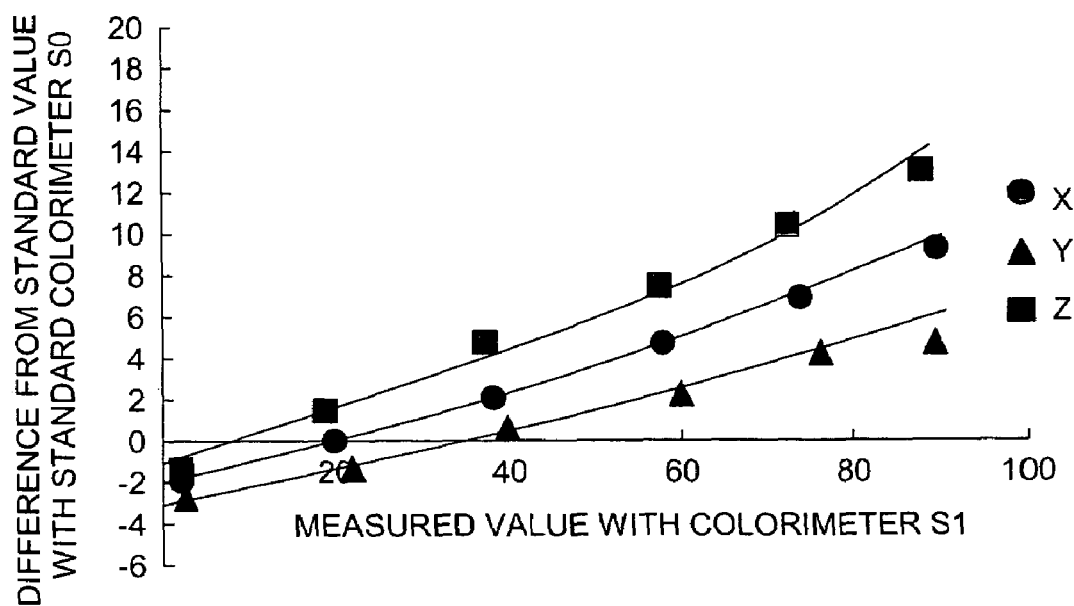

A Technique of Finding the Factors (at α, β, γ) of Quadratic Function by Regression Analysis In the first place, the difference between the standard values of the color and density of color chart for colorimeter correction P provided by standard colorimeter S0 and measured values of the color and density of color chart for colorimeter correction P provided by colorimeter S1 are obtained for each of the elements X, Y and Z. As shown in FIGS. 5(a) and (b), the measured value provided by the colorimeter S1 is represented on the horizontal axis, and the difference from the standard colorimeter S0 provided by the standard colorimeter S0 is represented on the vertical axis. Thus, a graph is created by plotting for each measuring point, and an approximate curve for the difference of measured values is calculated for each element. Assuming that the measured values provided by the colorimeter S1 are Xu, Yu and Zu, and the differences from the standard colorimeter S0 are Dx (Xu), Dy (Yu) and Dz (Zu), this approximate curve can be expressed as follows:

Part 1: The approximate curve passes through the origin (corresponding to FIG. 5(a)).

$$Dx(Xu)=Xs-Xu=\alpha(Xu+\beta)^2$$

$$Dy(Yu)=Ys-Yu=\alpha(Yu+\beta)^2$$

$$Dz(Zu)=Zs-Zu=\alpha(Zu+\beta)^2$$

where $\alpha$ and $\beta$ denote factors in the same sample measurement.

Part 2: The approximate curve does not always pass through the origin (corresponding to FIG. 5(b)).

$$Dx(Xu)=Xs-Xu=\alpha Xu^2+\beta Xu+\gamma$$

$$Dy(Yu)=Ys-Yu=\alpha Yu^2+\beta Yu+\gamma$$

$$Dz(Zu)=Zs-Zu=\alpha zu^2+\beta Zu+\gamma$$

where $\alpha$, $\beta$ and $\gamma$ denote factors in the same sample measurement.

For the aforementioned approximate curve, the values of $\alpha$, $\beta$ and $\gamma$ are found by the method of least square for each of the elements X, Y and Z to derive the correction formula as the function for Xs, Ys and Zs, following Xu=, Yu= and Zu=.

EXAMPLE 2

A Technique of Finding the 3×3 Matrix Factors ($a_{00}$ through $a_{22}$) by Regression Analysis Part 1: Without intercept Here Xs, Ys and Zs stand for the standard values of the color and density of color chart for colorimeter correction P provided by standard colorimeter S0, while Xu, Yu and Zu indicate the measured values of the color and density of color chart for colorimeter correction P provided by colorimeter S1. The $a_{00}$ through $a_{22}$ are the factors in the same sample measurement.

Part 2: With intercept

Here Xs, Ys and Zs stand for the standard values of the color and density of color chart for colorimeter correction P provided by standard colorimeter S0, while Xu, Yu and Zu indicate the measured values of the color and density of color chart for colorimeter correction P provided by colorimeter S1. The $a_{00}$ through $a_{22}$ are the factors in the same sample measurement, and b1 through b3 are the constants in the same sample measurement.

For each optical fiber the aforementioned formulas, the values of $a_{00}$ through $a_{22}$ and $b_1$ through $b_3$ are found by regression analysis for each of the elements X, Y and Z to derive the correction formula as shown below.

Part 1: without intercept
Part 2: with intercept

EXAMPLE 3

Figure 6:
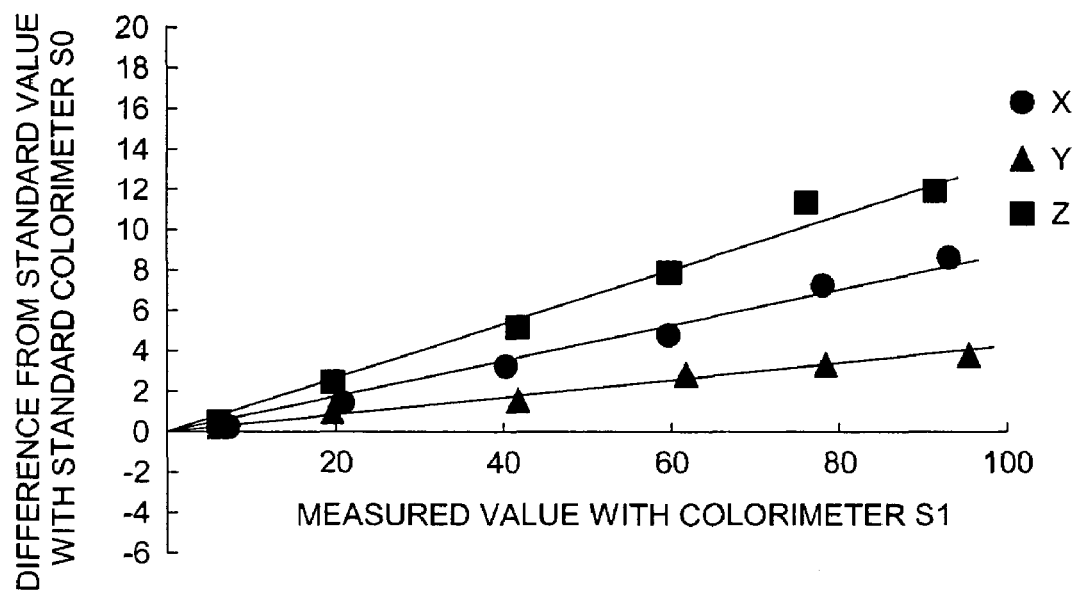
FIGS. 6(a) and (b) are explanatory diagrams representing the step of the factor of a linear function as the correction formula being obtained by regression analysis in the correction formula derivation section of the color control information providing system shown in FIG. 1.
Figure 6:
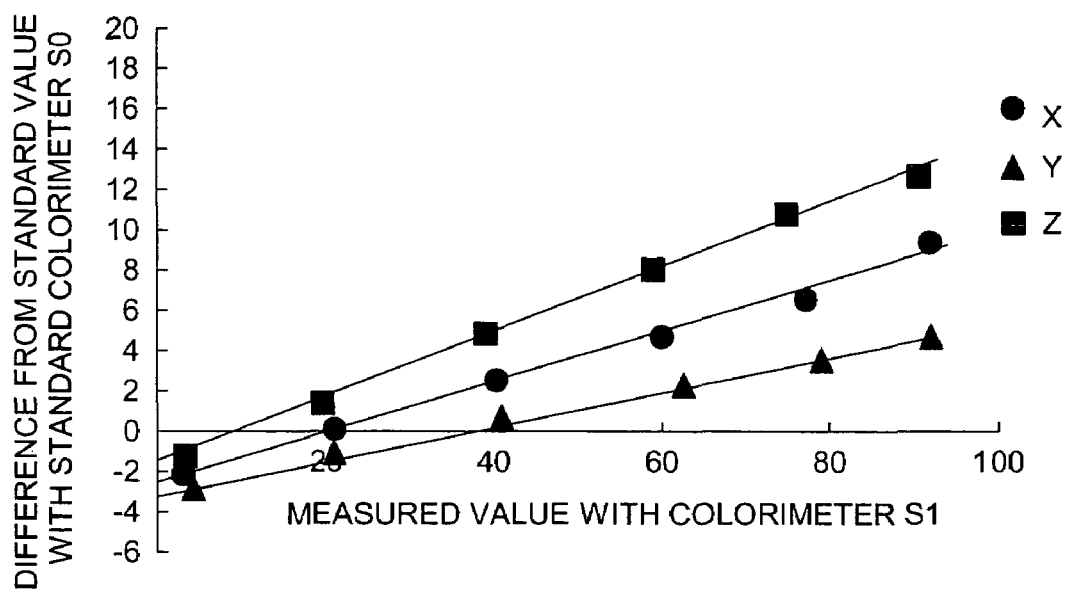

A Technique of Finding the Factors ($\alpha$ and $\beta$) of the Linear Function by Regression Analysis In the first place, the difference between the standard values of the color and density of color chart for colorimeter correction P provided by standard colorimeter S0 and measured values of the color and density of color chart for colorimeter correction P provided by colorimeter S1 is found. As shown in FIGS. 6(a) and (b), the measured value provided by the colorimeter S1 is represented on the horizontal axis, and the difference from the standard colorimeter S0 provided by the standard colorimeter S0 is represented on the vertical axis. Thus, a graph is created by plotting for each measuring point, and an approximate curve for the difference of measured values is calculadted for each element. Assuming that the measured values provided by the colorimeter S1 are Xu, Yu and Zu, and the differences from the standard colorimeter S0 are Dx (Xu), Dy (Yu) and Dz (Zu), this approximate curve can be expressed as follows:

Part 1: The approximate curve passes through the origin (corresponding to FIG. 6(a)).

$$Dx(Xu)=Xs-Xu=\alpha xu$$

$$Dy(Yu)=Ys-Yu=\alpha Yu$$

$$Dz(Zu)=Zs-Zu=\alpha Zu$$

where $\alpha$ denotes a factor in the same sample measurement.

Part 2: The approximate curve does not always pass through the origin (corresponding to FIG. 6(b)).

$$Dx(Xu)=Xs-Xu=\alpha xu+\beta$$

$$Dy(Yu)=Ys-Yu=\alpha Yu+\beta$$

$$Dz(Zu)=Zs-Zu=\alpha zu+\beta$$

where $\alpha$ and $\beta$ denote factors in the same sample measurement.

For the aforementioned approximate curve, the values of $\alpha$ and $\beta$ are found by the method of least square for each of the elements X, Y and Z to derive the correction formula shown below.

Part 1: The approximate curve passes through the origin (corresponding to FIG. 6(a)).

$$Xu=Xs/(\alpha+1)$$

$$Yu=Ys/(\alpha+1)$$

$$Zu=Zs/(\alpha+1)$$

Part 2: The approximate curve does not always pass through the origin (corresponding to FIG. 6(b)).

$$Xu=(Xs-\beta)/(\alpha+1)$$

$$Yu=(Ys-\beta)/(\alpha+1)$$

$$Zu=(Zs-\beta)/(\alpha+1)$$

[Determining Step (Selection Step)]

In the control server 1, the calculation section 1d again converts the measured values of the color and density of the color chart for colorimeter correction P provided by the colorimeter S1 at various measuring points corrected by these multiple correction formulas, and the standard values of the color and density of the color chart for colorimeter correction P provided by the standard colorimeter S0 at various measuring points, into the values expressed in the values L*, a* and b* in the CIE L*a*b* color system. Then the value, $\Delta E=\{(\Delta L^*)^2+(\Delta a^*)^2+(\Delta b^*)^2\}^{1/2}$, as a difference between these values is calculated for each measuring point, and the correction formula that minimizes their average or maximum value is selected as a correction formula of the highest precision.

Incidentally, in practice, comparison between the aforementioned Examples 2 and 3 reveals that the correction formula of Example 3 tends to exhibit higher correction precision if the standard colorimeter S0 and colorimeters S1 through S3 are of different makes and models. In the meantime, the correction formula of Example 2 tends to exhibit higher correction precision if the standard colorimeter S0 and colorimeters S1 through S3 are of the same makes and models.

[Correction Formula Registration Step]

Going back to FIG. 4, the control server 1 allows the registration section 1f to register the correction formula having the highest correction precision selected by the selection section 1e (S09). In this case, the registration section 1f registers the correction formula having the highest correction precision selected by the selection section 1e, on the assumption that the standard values provided by standard colorimeter S0 and the measured values provided by colorimeter S1 are expressed in the XYZ (tristimulus values) color system. As described above, the color system of the XYZ (tristimulus values) allows the measured values to be expressed always in the positive values, and this feature facilitates correction of measured values.

As described above, the colorimeter measured value control system of the present invention, without depending on the models of colorimeters S1 through S3, is capable of deriving a plurality of correction formulas for performing the correction to approximate the measured values of the color and density of the color chart for colorimeter correction P provided by the colorimeters S1 through S3, to the standard values of the color and density of the color chart for colorimeter correction P provided by the standard colorimeter S0, thereby selecting the correction formula of the highest correction precision. This allows the manager to ensure appropriate control of the measured values provided by the colorimeters S1 through S3.

[Correction Formula Transmission Step]

Upon completion of all the steps described above, the control server 1 allows the transmission section 1g to notify the terminal apparatus 2a that the measured values provided by the colorimeter S1 have been registered. To put it in greater details, the transmission section 1g notifies the terminal apparatus 2a of completion of the registration of the correction formula for correcting the standard values of the color and density of color chart for colorimeter correction P provided by standard colorimeter S0, to conform to the measured values of the color and density of color chart for colorimeter correction P provided by colorimeter S1.

In this case, the control server 1 allows correction formula derivation section 1c to evaluate the difference between the standard values of the color and density of color chart for colorimeter correction P provided by standard colorimeter S0 and the measured values of the color and density of color chart for colorimeter correction P provided by colorimeters S1 through S3. For example, if the difference is greater than the specified value, the transmission section 1g sends the information on the correction formula having the highest correction precision registered in the registration section 1f, to the terminal apparatus 2a.

[Correction Formula Reception Step and Correction Formula Display Step]

In the terminal apparatus 2a, the terminal apparatus 2a receives the information, sent from the transmission section 1g of the control server 1, that registration of the colorimeter S1 has been completed. At the same time, the terminal apparatus 2a also receives the information on the correction formula having the highest correction precision, when transmission has been performed. Then the display section 2ad displays the information indicating completion of registration of the colorimeter S1, and the information on the correction formula having the highest precision in correcting the difference of the measured value of the colorimeter S1 with respect to the standard value.

Upon completion of all these steps mentioned above, the control server 1 allows the user to make sure that the registration of the measured value of the colorimeter S1 has been completed. It also permits the user to get the information on the information on the correction formula having the highest precision in correcting the difference of the measured value of the colorimeter S1 with respect to the standard value. This permits the measured value of the colorimeter S1 to be corrected according to the correction formula, with the result that the difference from the measured value provided by the standard colorimeter S0 is corrected.

The steps discussed so far are concerned with the description of the colorimeter measured value control system and colorimeter measured value control method of the present invention. The following describes the color control information providing system and color control information providing method of the present invention, containing the colorimeter measured value control system and colorimeter measured value control method. In the color control information providing system and color control information providing method, however, the aforementioned steps from [correction formula transmission step] to [correction formula display step] can be omitted.

[Output Measured Value Transmission Step]

As shown in FIG. 7, in order to calibrate the outputting apparatus C1, a user employs the outputting apparatus C1 to output the aforementioned target (S10), and utilizes the colorimeter S1 to measures the color and density of the target (S11). Further, the user accesses the control server 1 from the terminal apparatus 2a, and inputs the measured value of the colorimeter S1 through the input section 2aa, on the aforementioned screen displayed in a predetermined site of the Web. In this case, it is also possible to arrange such a configuration that the measured value of the colorimeter S1 is sent directly to the control server 1 from the colorimeter S1 through the transmission section 2ab, without inputting this value in the terminal apparatus 2a.

[Output Measured Value Reception Step]

In the control server 1, the reception section 1b receives the measured value sent from the transmission section 2ab of the terminal apparatus 2a, namely, the measured value of the color and density of the target. This measured value is registered in the registration section 1f (S12).

[Calculation Step and Error Registration Step]

The control server 1 allows the calculation section 1d to correct the measured value of this colorimeter S1 according to the correction formula of the highest correction precision selected by the selection section 1e. This step removes the difference between the measured value provided by the colorimeter S1 and that by the standard colorimeter S0. The corrected value is registered in the registration section 1f (S14).

The calculation section 1d calculates the difference by comparison between the measured value of the color and density of the target stored in the storage section 1a as a standard value in step S03, and the corrected value of the measured value on the color and density of the target provided by the colorimeter S1 registered in the registration section 1f in step S13. This difference is again converted into the value expressed in the in the CIE L*a*b* color system, and is registered as $\Delta E=\{(\Delta L^*)^2+(\Delta a^*)^2+(\Delta b^*)^2\}^{1/2}$ in the registration section 1f (S15).

[Error Transmission Step]

In this case, the calculation section 1d creates a diagnosis report, as required, and the transmission section 1g sends it to the terminal apparatus 2a (S16).

What is herein called "diagnosis report" corresponds to the "color control information" of the present invention. To put it more specifically, it is electronic information showing a tabulated list of:

an average of the values ΔE at various measuring points as differences between the measured value of the color and density of the target stored as a standard value in the storage section 1a and the measured value of the color and density of the target provided by the colorimeter S1 registered in the registration section 1f;

the maximum of the values at various measuring points;

a standard deviation or a color difference distribution in the L*a*b* space;

a gray balance (=evaluation of three colors of C, M and Y having the same value (e.g. 20% C, 20% M and 20% Y)); and transition of the evaluation data registered so far (history control).

]Error Reception Step and Error Display Step]

In the terminal apparatus 2a, the reception section 2ac receives this diagnosis report and the display section 2ad displays it.

The user approximates the color and density of the output to the desired values by making various adjustments of the outputting apparatus C1, based on the information in this diagnosis report, namely, information on the measured value of the color and density stored as a standard value in the storage section 1a, and the value ΔE as the difference of the measured value of the color and density of the target provided by the colorimeter S1, registered in the registration section 1f in S12.

For the colorimeters S2 and S3, and outputting apparatuses C2 and C3 arranged in other bases, the user takes the steps discussed so far, in the similar manner, whereby calibration of approximating the measured values of the color and density of the product to predetermined values can be performed approximately for the outputting apparatuses C1 through C3 arranged in all bases. This allows the outputting apparatuses C1 through C3 installed at all bases to produce the outputs having the same color and density.

As described above, according to the colorimeter measured value control system and colorimeter measured value control method of the present embodiment, the correction formula derivation section 1c of the control server 1 derives a plurality of correction formulas for performing the correction to approximate the measured values of the color and density of the color chart for colorimeter correction P provided by the colorimeters S1 through S3, to the standard values of the color and density of the color chart for colorimeter correction P provided by the standard colorimeter S0, according to a plurality of calculation methods, based on the measured values of the color and density of the color chart for colorimeter correction P provided by the standard colorimeter S0 stored in the storage section 1a and the measured values of the color and density of the color chart for colorimeter correction P provided by the colorimeters S1 through S3 received by the reception section 1b. The selection section 1d calculates the measured values of the color and density of the color chart for colorimeter correction P provided by the colorimeters S1 through S3, having been corrected by these multiple correction formulas, and $\Delta E=\{(\Delta L^*)^2+(\Delta a^*)^2+(\Delta b^*)^2\}^{1/2}$ value s the difference from the standard values of the color and density of the color chart for colorimeter correction P provided by the standard colorimeter S0, and selects the correction formula where their average or the maximum value is minimized, as the correction formula of the highest correction precision. This allows the manager to provide an appropriate control of the differences of the measured values provided by the colorimeters S1 through S3. At the same time, this also allows the user to perform the correction of the measured values of colorimeters S1 through S3 at each base according to the correction formula, and to adjust the outputting apparatuses C1 through C3 according to the corrected measured values, thereby ensuring appropriate calibration of the outputting apparatuses C1 through C3 installed at multiple bases.

In addition to the aforementioned advantages, the color control information providing system and color control information providing method of the present embodiment provide the following advantages: The calculation section 1d calculates:

the correction value obtained by correcting the measured value of the color and density of the target provided by the colorimeters S1 through S3, according to the correction formula of the highest correction precision selected by the selection section 1d; and the $\Delta E=\{(\Delta L^*)^2+(\Delta a^*)^2+(\Delta b^*)^2\}^{1/2}$ as a difference from the standard value of the color and density of the target provided by the standard colorimeter S0, based on the measured values of the color and density of the color chart for colorimeter correction P provided by the standard colorimeter S0 stored in the storage section 1a and the measured values of the color and density of the color chart for colorimeter correction P provided by the colorimeters S1 through S3 received by the reception section 1b; then the registration section 1e registers the information on the difference, and the transmission section if sends the information on the difference to the terminal apparatuses 2a through 2c as a diagnosis report. This allows the manager to make more detailed control of the difference in the measured values provided by colorimeters S1 through S3. At the same time, this permits the user to adjust the correction formula derivation section 1c at each base according to the diagnosis report, thereby ensuring appropriate calibration of the outputting apparatuses C1 through C3 installed at multiple bases.

It should be noted that the colorimeter measured value control system with colorimeter measured value control method thereof, and the color control information providing system with color control information providing method thereof according to the present invention are not restricted to the aforementioned embodiment. They can be modified in various ways without departing from the spirit of the invention.

For example, in the colorimeter measured value control system and colorimeter measured value control method thereof in the aforementioned embodiment, the measured values of the standard colorimeter S0 and colorimeters S1 through S3 are calculated in the CIE L*a*b* color system or XYZ color system. It is also possible to arrange such a configuration that they are calculated in the CIE L*u*v* color system as well.

According to the above description, the color chart for colorimeter correction P is preferred to be outputted by the DCCP. It is also possible to arrange such a configuration that the color chart for colorimeter correction P is produced by such an outputting apparatus as a printer and copying machine.

Each color chart for colorimeter correction P can be mailed to each of the colorimeters S1 through S3 arranged in various bases. It is also possible to arrange such a configuration that one color chart for colorimeter correction P is circulated through the colorimeters S1 through S3, or a plurality of color charts for colorimeter correction controlled to provide one and the same color and density are each sent to the colorimeters S1 through S3.

It is also possible to configure the color chart for colorimeter correction P in such a way that only the area for reproducing the color close to the human skin, for example, is measured, instead of all gradations being measured.

The sole requirement of the color chart for colorimeter correction P is that it is a color chart consisting of multiple colors containing at least one of C, M, Y and K, provided that, if two or more are contained, at least one gradation is changed in steps and the rest are kept constant.

[Color Control Method in Color Control Information Providing System—Embodiment 2]

Figure 8:
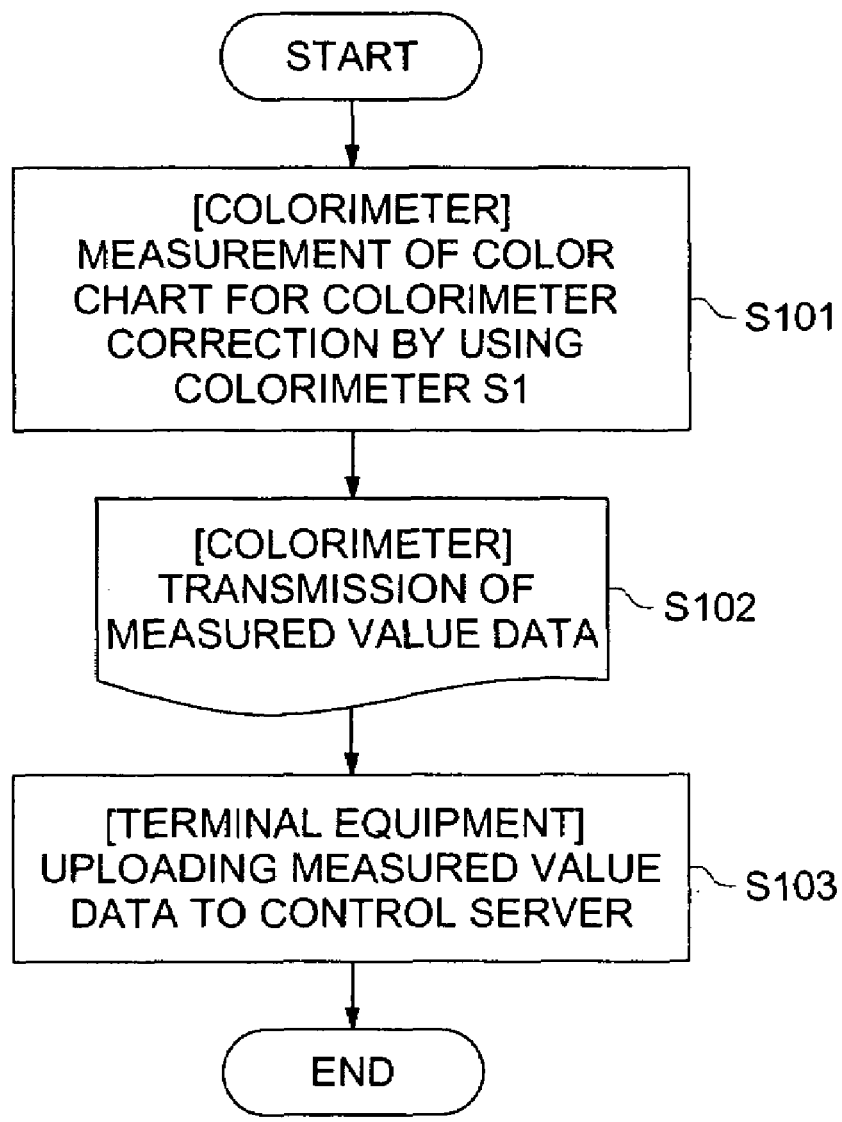
FIG. 8 is a flowchart representing the flow in the color control method used in the colorimeter of a color control system and a terminal apparatus shown in FIG. 1.
Figure 9:
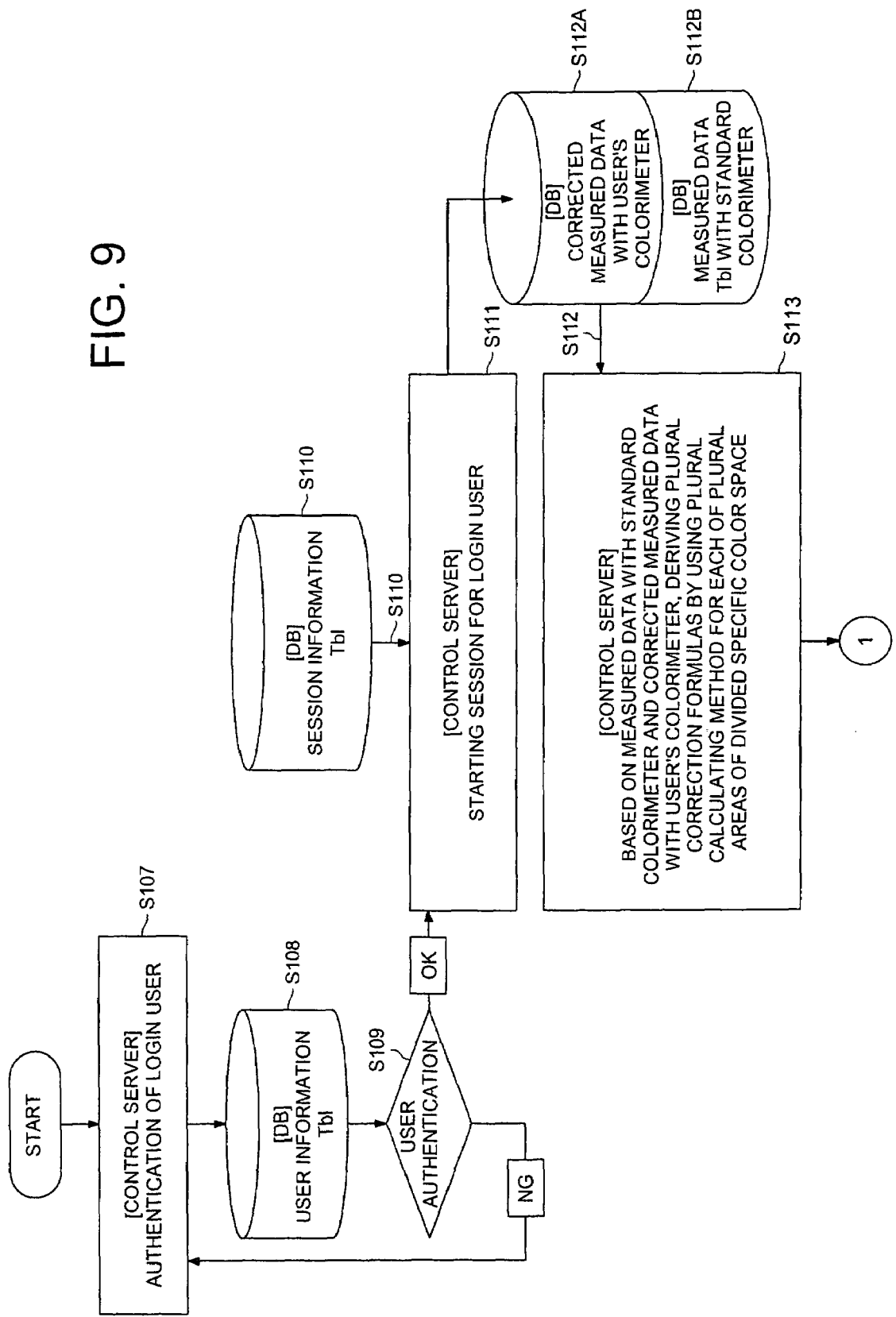
FIG. 9 is a flowchart representing the color control method used in the control server of the color control system shown in FIG. 1.
Figure 10:
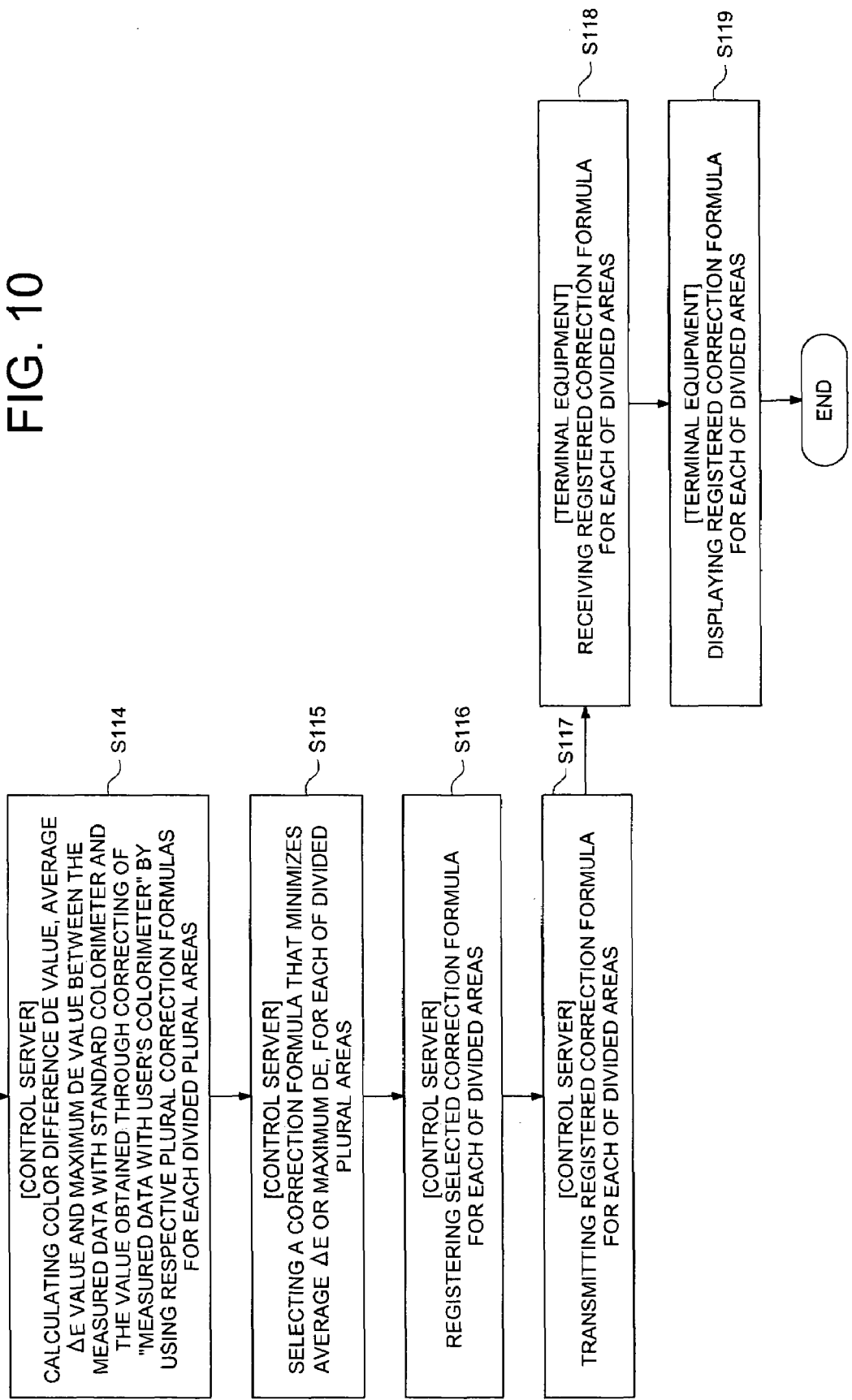
FIG. 10 is a flowchart representing the color control method used in the control server and terminal apparatus of the color control system shown in FIG. 1.
Figure 12:
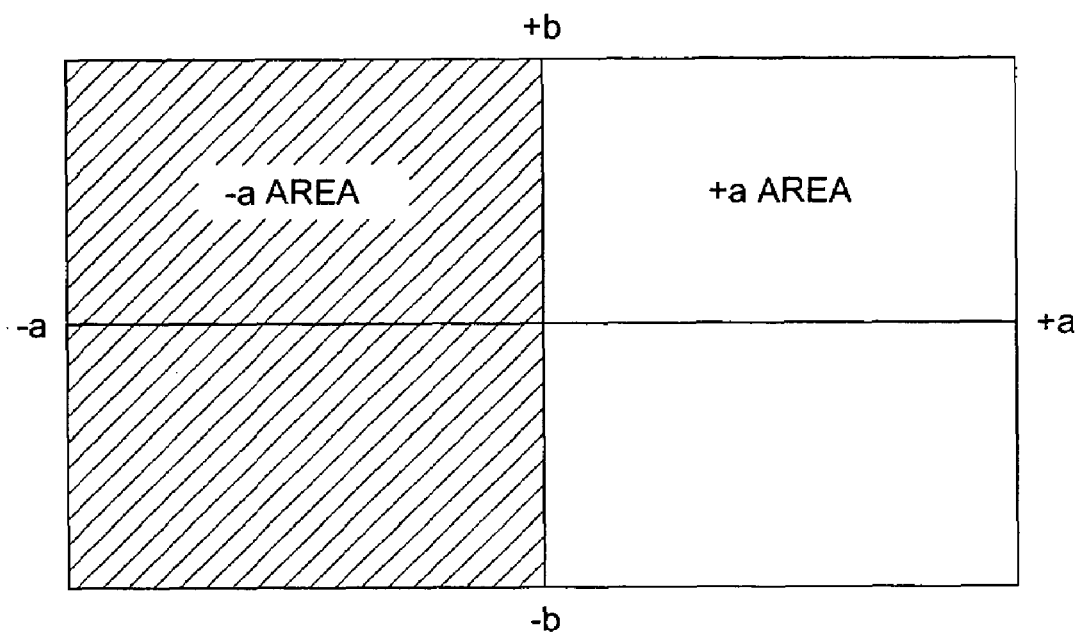
FIGS. 12(a) and (b) are explanatory diagrams representing the process wherein, in the correction formula derivation section of the control server shown in FIG. 1, the measured values of the color and density in the predetermined color system at each measuring point of the color chart for colorimeter correction by a colorimeter are classified for each relevant area, where the color space in the specified color system is divided into a plurality of areas.
Figure 12:
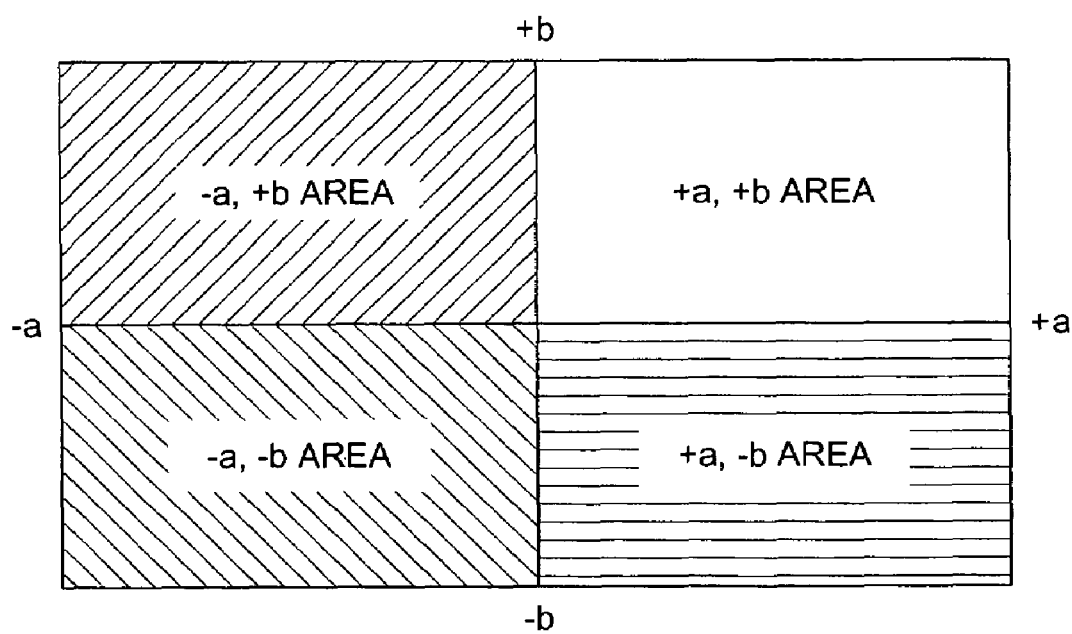

According to the flowcharts shown in FIGS. 8 through 10, the following describes the second embodiment of the color control information providing method used in the aforementioned color control information providing system, with reference to FIGS. 11 through 13: The following description uses the example of the case where measured values provided by the colorimeter S1 are corrected and the outputting apparatus C1 is calibrated.

[Color Sample Measured Value Storage Step]

The manager of the control server 1 uses the standard colorimeter S0 to measure the color and density of the aforementioned color chart for colorimeter correction P according to the information on the position of the measuring points and the order of measurement. This operation provides the measured values of the color and density of the color chart for colorimeter correction P at various measuring points in the predetermined color system.

Then the manager uses the input means such as a keyboard and mouse, or the registration file storing the measured values to input the measured values of the color and density of the color chart for colorimeter correction P provided by the standard colorimeter S0 at various measuring points in the predetermined color system. In this case, however, the manager also enters the information on the position of the measuring points with respect to the color chart for colorimeter correction P and the order of measurement. In this fashion, the measured values of the color and density of the color chart for colorimeter correction P at various measuring points in the predetermined color system, together with the information on the position of the measuring points and the order of management, are stored in the standard measuring instrument measurement data table (to be described later) of the storage section 1a as standard measuring instrument measurement data.

A user employing the color control system operates the terminal apparatus 2a to register the measured values of the color and density of the color chart for colorimeter correction P provided by the colorimeter S1 at various measuring points in the predetermined color system. To put it more specifically, the user accesses the control server 1 from the terminal apparatus 2a and inputs the predetermined item—specifically, information on the destination for mailing the color chart for colorimeter correction P as an object of the measurement by the colorimeter S1—(e.g. address, name and telephone number of the person as a mailing destination) and other information on the screen displayed at a predetermined site of the Web.

In response to the above operation, the manager at the control server 1 checks the predetermined items on the aforementioned screen displayed at a predetermined site of the Web, and mails the color chart for colorimeter correction P to the specified destination.

Upon arrival of the color chart for colorimeter correction P, the user connects the colorimeter S1 with the input section 2aa of the terminal apparatus 2a using communication means such as a communications cable, and accesses the control server 1 from the terminal apparatus 2a. The manager downloads a measuring tool on the aforementioned tool screen displayed on the Web page. The measuring tool in this case includes the information on the position of the measuring points with respect to the color chart for colorimeter correction P and the order of measurement, and the information on the destination of the measured values of the color and density of the color chart for colorimeter correction P provided by the colorimeter S1 at various measuring points in the predetermined color system. This measuring tool is downloaded to the colorimeter S1 through the terminal apparatus 2a, and measures the measuring points at the same position as those provided by the standard colorimeter S0 in the same order of measurement. It is also possible to arrange such a configuration that this measuring tool is stored in the memory medium such as a CD-ROM and is downloaded to the colorimeter S1 through the terminal apparatus 2a.

[Color Sample Measured Value Transmission Step]

In the manner described above, when the color and density of the color chart for colorimeter correction P at various measuring points in the predetermined color system have been measured by the colorimeter S1 (S101), as shown in FIG. 8, these measured values are sent to the terminal apparatus 2a through the input section 2aa (S102). In this case, the measured values of the color and density of the color chart for colorimeter correction P at various measuring points in the predetermined color system are expressed by the values L*, a* and b* of the CIE L*a*b* color system in the measured value display column 10Aa of the measurement screen displayed on the display section of the terminal apparatuses 2a through 2c, specifically, the measurement screen 10A of color chart for colorimeter correction P shown in FIG. 11.

On the measurement screen 10A of color chart for colorimeter correction, the user operates the input means to select the transmission button, thereby sending the aforementioned information to the control server 1 from the transmission section 2ab of the terminal apparatus 2a (S103).

As shown in FIG. 9, the transmission section 2ab of the terminal apparatus accesses the control server 1, and the display section 2ad displays the login screen. Further, when the user operates the input means to perform login operation on this login screen, the registration section if of the control server 1 authenticates the database on the user of the terminal apparatus 2a having accessed the control server 1 (S107). To put it another way, the identification information on the user employing the terminal apparatuses 2a through 2c is stored in the registration section 1f as a user information table. User authentication is performed (S109) by referring to the user information table. (S108). When the user has been authenticated (OK in S109), the registration section if refers to the setting information stored in the session information table (S110), and starts a session with the authenticated user, i.e. the terminal apparatus 2a according to the setting information (S111).

[Color Sample Measured Value Reception Step]

In response to the step, the transmission section 2ab of the terminal apparatus 2a sends the measured values of the color and density of the color chart for colorimeter correction P at various measuring points in the predetermined color system, to the control server 1. In the control server 1, these measured values are received by the reception section 1b, and are stored in the user measuring tool measurement data table of the storage section 1b. Here the storage section 1b stores the correction information for correcting the difference of measured values between the standard colorimeter S0 and colorimeter S1 resulting from differences in makes and models, in the user measuring tool measurement data table. The measured values of the color and density of the color chart for colorimeter correction P provided by the standard colorimeter S0 at various measuring points in the predetermined color system, stored in the user measuring tool measurement data table are corrected by the correction information stored in this user measuring tool measurement data table, whereby this information is stored as the corrected user measuring tool measurement data where the difference of measured values from those of the standard colorimeter S0 resulting from differences in makes and models has been corrected.

[Correction Formula Derivation Step]

In response to the aforementioned flow of steps, the correction formula derivation section 1c acquires the corrected user measuring tool measurement data stored in the storage section 1a and the standard measuring instrument measurement data stored in the standard measuring instrument measurement data table of the storage section 1a (S12). The acquired corrected user measuring tool measurement data, namely, the data on the measured values of the color and density of the color chart for colorimeter correction P provided by the colorimeter S1 at various measuring points in the predetermined color system is divided for each of the areas, where the color space in the predetermined color system is divided into a plurality of areas; to put it more specifically, the color space in the CIE L*a*b* color system is divided into a plurality of areas—namely, two areas consisting of "+a* area" and "−a* area" in a*×b* space; and four areas consisting of "+a*, +b* area", "+a*, −b* area", "−a*, +b* area" and "−a*, −b* area" in the a*×b* area, as shown in FIGS. 12(a) and (b). After this division has been made, the correction formula derivation section 1c derive a plurality of correction formulas for performing the correction to approximate the measured values of the color and density of the color chart for colorimeter correction P provided by the colorimeter S1 at various measuring points in the predetermined color system, to the acquired standard measuring instrument measurement data, namely, the measured values of the color and density of the color chart for colorimeter correction P provided by the standard colorimeter S0 at various measuring points in the predetermined color system, for each divided area (S113).

It is preferred in the correction formula derivation section 1c that the aforementioned correction formula be derived, after the measured value expressed, for example, in the L*a*b* color system of CIE (Commission Internationale de l'Eclairage) have been converted into the measured value that can be expressed in the XYZ (tristimulus values). This is because the color system of the XYZ (tristimulus values) allows the measured values to be expressed always in the positive values, and this feature facilitates correction of measured values. However, measured values may be calculated in the color system of the XYZ (tristimulus values), depending on the configuration of the colorimeter S1. In such cases, the aforementioned conversion need not be carried out.

(Details of Conversion Method)

The following specifically describes the details of the method for converting the measured value from the aforementioned L*a*b* color system of CIE (Commission Internationale de l'Eclairage) to the XYZ (tristimulus values) color system.

Formula for conversion from L*a*b* color system to XYZ (tristimulus values) color system For example, the following relation is found between the (L, a, b) and (X, Y, Z) in the case of D50 light source (standard color temperature (5000K) of the printing industry):

$y=(L+16.0)/116.0$ $x=a/500.0+y$ $z=y-b/200.0$

If xs0, ys0, zs0 > 0.008856

$xs0=x^3$ $ys0=y^3$ $zs0=z^3$

If xs0, ys0, zs0 ≤ 0.008856

$xs0=[x-(16.0/116.0)]/7.787$ $ys0=[y-(16.0/116.0)]/7.787$ $zs0=[z-(16.0/116.0)]/7.787$

Substituting them into $X=xs0 \times 0.98072$ $Y=xs0 \times 1.00000$ $Z=xs0 \times 1.18225$ Then elements X, Y and Z each can be properly expressed in terms of L, a and b.

(Specific Examples of Multiple Calculation Techniques)

The following describes the specific examples of multiple calculation techniques used when multiple correction formulas are derived by the aforementioned correction formula derivation section 1c.

The correction formula derivation section 1c derives multiple correction formulas according to various calculation techniques described below, including the calculation technique disclosed in the Official Gazette of Japanese Patent Tokkai 1999-132849 (FIGS. 1 through 5 in, and paragraphs [0015]-[0050]).

EXAMPLE 1

A Technique of Finding the Factors (α, β, γ) of Quadratic Function by Regression Analysis In the first place, the difference between the standard values of the color and density of color chart f or colorimeter correction P provided by standard colorimeter S0 (obtained by converting the measured values expressed in the L*a*b* color system into those expressed in the XYZ color system) and measured values of the color and density of color chart for colorimeter correction P provided by colorimeter S11725 (obtained by converting the measured values expressed in the L*a*b* color system into those expressed in the XYZ color system) are obtained for each of the elements X, Y and Z. As shown in FIGS. 5(a) and (b), the measured value provided by the colorimeter S1 is represented on the horizontal axis, and the difference from the standard colorimeter S0 provided by the standard colorimeter S0 is represented on the vertical axis. Thus, a graph is created by plotting f or each measuring point, and an approximate curve for the difference of measured values is calculated for each element. Assuming that the measured values provided by the colorimeter S1 are Xu, Yu and Zu, and the differences from the standard colorimeter S0 are Dx (Xu), Dy (Yu) and Dz (Zu), this approximate curve can be expressed as follows:

Part 1: The approximate curve passes through the origin (corresponding to FIG. 5(a)).

$$Dx(Xu)=Xs-Xu=\alpha(Xu+\beta)^2$$

$$DY(Yu)=Ys-Yu=\alpha(Yu+\beta)^2$$

$$Dz(Zu)=Zs-Zu=\alpha(Zu+\beta)^2$$

where $\alpha$ and $\beta$ denote factors in the same sample measurement.

Part 2: The approximate curve does not always pass through the origin (corresponding to FIG. 5(b)).

$$Dx(Xu)=Xs-Xu=\alpha Xu^2+\beta Xu+\gamma$$

$$Dy(Yu)=Ys-Yu=\alpha Yu^2+\beta Yu+\gamma$$

$$Dz(Zu)=Zs-Zu=\alpha Zu^2+\beta Zu+\gamma$$

where $\alpha$, $\beta$ and $\gamma$ denote factors in the same sample measurement.

where $\alpha$, $\beta$ and $\gamma$ denote factors in the same sample measurement.

For the aforementioned approximate curve, the values of $\alpha$, $\beta$ and $\gamma$ are found by the method of least square for each of the elements X, Y and Z to derive the correction formula as the function for Xs, Ys and Zs, following Xu=, Yu= and Zu=.

EXAMPLE 2

A Technique of Finding the 3×3 Matrix Factors ($a_{00}$ through $a_{22}$) by Regression Analysis Part 1: Without intercept Here Xs, Ys and Zs stand for the standard values of the color and density of color chart for colorimeter correction P provided by standard colorimeter S0, while Xu, Yu and Zu indicate the measured values of the color and density of color chart for colorimeter correction P provided by colorimeter S1. The $a_{00}$ through $a_{22}$ are the factors in the same sample measurement.

Part 2: With intercept

Here Xs, Ys and Zs stand for the standard values of the color and density of color chart for colorimeter correction P provided by standard colorimeter S0, while Xu, Yu and Zu indicate the measured values of the color and density of color chart for colorimeter correction P provided by colorimeter S1. The $a_{00}$ through $a_{22}$ are the factors in the same sample measurement, and b1 through b3 are the constants in the same sample measurement.

For each optical fiber the aforementioned formulas, the values of $a_{00}$ through $a_{22}$ and b1 through b3 are found by regression analysis for each of the elements X, Y and Z to derive the correction formula as shown below.

Part 1: without intercept

Part 2: with intercept

EXAMPLE 3

A Technique of Finding the Factors ($\alpha$ and $\beta$) of the Linear Function by Regression Analysis In the first place, the difference between the standard values of the color and density of color chart for colorimeter correction P provided by standard colorimeter S0 (obtained by converting the measured values expressed in the L*a*b* color system into those expressed in the XYZ color system) and measured values of the color and density of color chart for colorimeter correction P provided by colorimeter S1 (obtained by converting the measured values expressed in the L*a*b* color system into those expressed in the XYZ color system) is found. As shown in FIGS. 9(a) and (b), the measured value provided by the colorimeter S1 is represented on the horizontal axis, and the difference from the standard colorimeter S0 provided by the standard colorimeter S0 is represented on the vertical axis. Thus, a graph is created by plotting for each measuring point, and an approximate curve for the difference of measured values is calculated for each element. Assuming that the measured values provided by the colorimeter S1 are Xu, Yu and Zu, and the differences from the standard colorimeter S0 are Dx (Xu), Dy (Xu) and Dz (Zu), this approximate curve can be expressed as follows:

Part 1: The approximate curve passes through the origin (corresponding to FIG. 6(a)).

$$Dx(Xu)=Xs-Xu=\alpha Xu$$

$$Dy(Yu)=Ys-Yu=\alpha Yu$$

$$Dz(Zu)=Zs-Zu=\alpha Zu$$

where $\alpha$ denotes a factor in the same sample measurement.

Part 2: The approximate curve does not always pass through the origin (corresponding to FIG. 6(b)).

$$Dx(Xu)=Xs-Xu=\alpha Xu+\beta$$

$$Dy(Yu)=Ys-Yu=\alpha Yu+\beta$$

$$Dz(Zu)=Zs-Zu=\alpha zu+\beta$$

where $\alpha$ and $\beta$ denote factors in the same sample measurement.

For the aforementioned approximate curve, the values of $\alpha$ and $\beta$ are found by the method of least square for each of the elements X, Y and Z to derive the correction formula shown below.

Part 1: The approximate curve passes through the origin (corresponding to FIG. 6(a)).

$$Xu=Xs/(\alpha+1)$$

$$Yu=Ys/(\alpha+1)$$

$$Zu=Zs/(\alpha+1)$$

Part 2: The approximate curve does not always pass through the origin (corresponding to FIG. 6(b)).

$$Xu=(Xs-\beta)/(\alpha+1)$$

$$Yu=(Ys-\beta)/(\alpha+1)$$

$$Zu=(Zs-\beta)/(\alpha+1)$$

[Correction Formula Determining Step]

As shown in FIG. 5, in the control server 1, the calculation section 1d again converts the measured values of the color and density of the color chart for colorimeter correction P provided by the colorimeter S1 at various measuring points in the predetermined color system corrected by these multiple correction formulas, and the standard values of the color and density of the color chart for colorimeter correction P provided by the standard colorimeter S0 at various measuring points in the predetermined color system, into the values expressed in the CIE L*a*b* color system, for each of the aforementioned classified measured values. After that, the calculation section 1d calculates the $\Delta E = \{(\Delta L^*)^2 + (\Delta a^*)^2 + (\Delta b^*)^2\}^{1/2}$ as the color difference between the measured values of the color and density of the color chart for colorimeter correction P provided by the colorimeter S1 at various measuring points corrected by the aforementioned multiple correction formulas, and the standard values of the color and density of the color chart for colorimeter correction P provided by the standard colorimeter S0 at various measuring points; it also calculates the average value at various measuring points (average value $\Delta E$) or the maximum value (maximum value $\Delta E$) (calculation step in S14). The selection section 1e selects the correction formula that minimizes the aforementioned average value $\Delta E$ or maximum value $\Delta E$, as the correction formula of highest correction precision (correction formula selection step in S15). Incidentally, in practice, comparison between the aforementioned Examples 2 and 3 reveals that the correction formula of Example 3 tends to exhibit higher correction precision if the standard colorimeter S0 and colorimeters S1 through S3 are of different makes and models. In the meantime, the correction formula of Example 2 tends to exhibit higher correction precision if the standard colorimeter S0 and colorimeters S1 through S3 are of the same makes and models.

(Specific Examples of Determining the Calculation Formula)

The following describes the details of how the average value $\Delta E$ and maximum value $\Delta E$ are calculated by the aforementioned calculation section 1d, and how the correction formula of highest correction precision is selected by the selection section 1e:

FIG. 13 shows an example of the average value $\Delta E$ and maximum value $\Delta E$ calculated by the calculation section 1d. As shown in FIG. 10, in this example, the correction formula derivation section 1c divides the measured values of the color and density of the color chart for colorimeter correction P provided by the colorimeter S1 at various measuring points in the predetermined color system stored in the storage section 1a, into multiple areas of color space in the CIE L*a*b* color system—specifically, two areas consisting of "+a* area" and "−a* area" in a*×b* space, and four areas consisting of "+a*, +b* area", "+a*, -b* area", "−a*, +b* area" and "−a*, −b* area" in the a*×b* area. After this division has been made, the correction formula derivation section 1c derives a plurality of correction formulas for performing the correction to approximate the measured values of the color and density of the color chart for colorimeter correction P provided by the colorimeter S1, to the measured values of the color and density of the color chart for colorimeter correction P provided by the standard colorimeter S0 stored in the storage section 1a, for each divided area, according to the aforementioned multiple calculation methods, specifically including:

"Part 1 (a technique of finding the 3×3 matrix factors (without intercept))" in Example 2;

"Part 2 (a technique of finding the 3×3 matrix factors (with intercept))" in Example 2; and "Part 1 (a technique of finding the factors of the linear function (without intercept))" in Example 3. An example is given where the calculation section 1d calculates the $\Delta E = \{(\Delta L^*)^2 + (\Delta a^*)^2 + (\Delta b^*)^2\}^{1/2}$ as the color difference between the measured values of the color and density of the color chart for colorimeter correction P provided by the colorimeter S1 at various measuring points corrected by the aforementioned multiple correction formulas, and the standard values of the color and density of the color chart for colorimeter correction P provided by the standard colorimeter S0 at various measuring points; it also calculates the average value $\Delta E$ at various measuring points and the maximum value $\Delta E$. FIG. 13 also shows the average value $\Delta E$ at various measuring points and maximum $\Delta E$ when the correction formula derivation section 1c does not perform division into the aforementioned areas. Incidentally, as shown in FIG. 13, it can be confirmed that, if division into the aforementioned areas is performed regardless of whether the division is made into two or four areas, the average value $\Delta E$ at various measuring points and the maximum value $\Delta E$ are smaller than those in the conventional cases (without division into areas). To put it another way, it can be verified that correction precision is improved in each correction formula.

As described above, the calculation section 1d selects the correction formula that minimizes either the average value $\Delta E$ or the maximum value $\Delta E$ calculated by the calculation section 1d, as the correction formula having the highest correction precision. In this case, it is preferred that the selection of either of the two be made in a flexible manner; for example, selection be made in such a way that the maximum value $\Delta E$ or the average value $\Delta E$ is minimized, depending on each case. For example, as shown in FIG. 13, when the measured values of the color and density of the color chart for colorimeter correction P provided by the colorimeter S1 at various measuring points stored in the storage section 1a have been divided into two areas consisting of "+a* area" and "−a* area" in a*×b* space in the CIE L*a*b* color system, the variation of the average value $\Delta E$ in each in correction technique is as relatively small as 0.172 through 0.233. Thus, in such a case, the correction formula derivation section 1c selects the "a technique of finding the 3×3 matrix factors (with intercept)" where the maximum $\Delta E$ is minimized, i.e. 0.777, as the correction formula having the highest correction precision. In the meantime, when the measured values of the color and density of the color chart for colorimeter correction P provided by the colorimeter S1 at various measuring points stored in the storage section 1a have been divided into four areas consisting of "+a*, +b* area", "Y+a*, −b* area", "−a*, +b* area" and "−a*, −b* area" in the a*×b* area, the variation of the average value $\Delta E$ in each in correction technique is as relatively great as 0.166 through 0.299. Thus, in such a case, the correction formula derivation section 1c selects "a technique of finding the 3×3 matrix factors (with intercept)" where the average $\Delta E$ is minimized, i.e. 0.166, as the correction formula having the highest correction precision, not "a technique of finding the factors of the linear function (without intercept)" where the maximum $\Delta E$ is minimized, i.e. 0.777.

The processing stated above ensures proper selection of a correction formula having the highest correction precision when the measured values of the color and density of the color chart for colorimeter correction P provided by the colorimeter S1 at various measuring points in the predetermined color system contain some measured values much different form those of other measuring points, even if such measured values are concerned with the color not very important from the visual standpoint.

[Correction Formula Registration Step]

Going back to FIG. 10, the control server 1 allows the registration section 1f to register the correction formula having the highest correction precision selected by the selection section 1e (S16). In this case, the registration section 1f registers the correction formula for each of the aforementioned classified measured values selected by the selection section 1e, as the correction formula that can be expressed in the XYZ (tristimulus) color system. This is because the color system of the XYZ (tristimulus values) allows the measured values to be expressed always in the positive values, and this feature facilitates correction of measured values.

[Correction Formula Transmission Step]

Upon completion of all the steps described above, the control server 1 allows the transmission section 1g to notify the terminal apparatus 2a that the measured values provided by the colorimeter S1 have been registered. To put it in greater details, the transmission section 1g notifies the terminal apparatus 2a of completion of the registration of the correction formula for correcting the standard values of the color and density of color chart for colorimeter correction P provided by standard colorimeter S0, to conform to the measured values of the color and density of color chart for colorimeter correction P provided by colorimeter S1. At the same time, the information on the correction for each of the aforementioned classified measured values registered in the registration section 1f is sent to the terminal apparatus 2a (S117). Incidentally, it is also possible to arrange such a configuration that the information on the correction for each of the aforementioned classified measured values registered in the registration section 1f is sent to the terminal apparatus 2a by the transmission section 1g, only when the correction formula derivation section 1c evaluates the difference between the measured values of the color and density of the color chart for colorimeter correction P provided by the colorimeter S1 and the standard values of the color and density of the color chart for colorimeter correction P provided by the standard colorimeter S0, and the difference is greater than the specified value.

[Correction Formula Reception Step and Correction Formula Display Step]

In the terminal apparatus 2a, the terminal apparatus 2a receives the information, sent from the transmission section 1g of the control server 1, that registration of the colorimeter S1 has been completed (S118). The display section 2ad displays the information indicating completion of registration of the colorimeter S1, and the information on the correction formula, for each of the aforementioned classified measured values, to correct the difference of the measured value of the colorimeter S1 with respect to the standard value (S119).

By referring to the information on the correction formula for each of the aforementioned classified measured values to correct the difference of the measured value of the colorimeter S1 with respect to the standard value, the user corrects the measured values of the color and density of the output produced from the outputting apparatus C1, using the correction formula for each of the aforementioned classified measured values, corresponding to the area of color space in the predetermined color system to which the measured values belong. This step removes the difference with reference to the standard value. Further, appropriate calibration of the outputting apparatus C1 installed at the user's base can be achieved by adjusting the color and density of the output produced from the outputting apparatus C1 according to the corrected measured value.

When the aforementioned steps are applied to the colorimeter S2, outputting apparatus C2, colorimeter S3 and outputting apparatus C3 by the user at each base in the same manner, the difference of the measured values of the colorimeters S1 through S3 installed at all base with reference to the standard values can be removed, and appropriate calibration of the outputting apparatuses C1 through C3 installed at all bases can be ensured. This allows the output having the same color and density to be produced by the outputting apparatuses C1 through C3 installed at each base.

As described above, according to the color control system and its color control method in the present embodiment, the correction formula derivation section 1c classifies the measured values of the color and density of the color chart for colorimeter correction P provided by the colorimeters S1 through S3 at various measuring points in the predetermined color system, for each of the multiple areas obtained by dividing the color space of the predetermined color system into multiple areas, based on the standard values of the color and density of the color chart for colorimeter correction P provided by the standard colorimeter S0 at various measuring points in the predetermined color system stored in the storage section 1a and the measured values of the color and density of the color chart for colorimeter correction P provided by the outputting apparatuses C1 through C3 at various measuring points in the predetermined color system received by the reception section 1b. Then the correction formula derivation section 1c derives the correction formula for performing the correction to approximate the measured values of the color and density of the color chart for colorimeter correction P provided by the colorimeters S1 through S3, to the standard values of the color and density of the color chart for colorimeter correction P provided by the standard colorimeter S0, for each of the aforementioned classified measured values, according to a plurality of calculation methods. Then the calculation section 1d calculates the $\Delta E = \{(\Delta L^*)^2 + (\Delta a^*)^2 + (\Delta b^*)^2\}^{1/2}$ as the color difference between the measured values: of the color and density of the color chart for colorimeter correction P provided by the colorimeters S1 through S3 corrected by the aforementioned multiple correction formulas, and the standard values of the color and density of the color chart for colorimeter correction P provided by the standard colorimeter S0. The selection section 1e selects the correction formula that minimizes the aforementioned average value $\Delta E$ or maximum value $\Delta E$, as the correction formula of highest correction precision. The registration section 1f registers that correction formula as the one that corrects the difference between the measured values of the color and density of the color chart for colorimeter correction P provided by the colorimeters S1 through S3 and the standard value. This arrangement ensures the control server 1 to select the correction formula that enables high-precision correction in response to the area of the color space in the aforementioned color system, to which the measured values provided by the outputting apparatuses C1 through C3 belong. At the same time, this arrangement allows the user to measure the measured values of the color and density of the output produced from the outputting apparatuses C1 through C3, by referring to the relevant correction formula at each base, and corrects the measured values based on the correction formula corresponding to the area obtained by dividing the color space of the aforementioned predetermined color system, whereby the difference from the standard value is removed. Further, appropriate calibration of the outputting apparatus C1 installed at the user's base can be achieved by adjusting the color and density of the output produced from the outputting apparatuses C1 through C3 based on the corrected measured value.

The color control system and its color control method allows the user to receive the information on the correction formula registered in the registration section 1f, sent from the control server 1, using the reception section 2ac of the terminal apparatuses 2a through 2c installed at the user's base. Further, the user can display the received information on correction formula, using the display section 2ad. Thus, the user can refer to that information, without taking the trouble of visiting the place where the control server 1 is installed. This arrangement ensures efficient correction of the measured values provided by the colorimeters S1 through S3 installed at the user's base. Thus, appropriate calibration of the outputting apparatuses C1 through C3 installed at all bases is enabled by adjusting the outputting apparatuses C1 through C3 based on the corrected measured values.

The color control system and color control method of the present invention are not restricted to the aforementioned embodiments. They can be modified in various ways without departing from the spirit of the invention.

For example, in the aforementioned color control system and color control method, the standard colorimeter S0 and colorimeters S1 through S3 are described in such a way that the measured values can be calculated in the CIE L*a*b* color system or XYZ color system. It is possible to arrange such a configuration that the measured values can be calculated in the CIE L*u*v* color system as well.

The color control system and its color control method of the aforementioned embodiment adopt the CIE L*a*b* color system as the color system for classifying the measured values of the color and density of the color chart for colorimeter correction P provided by the colorimeters S1 through S3 corrected by multiple correction formulas. Two cases are given as examples for explaining the area obtained by dividing the color space into and a plurality of areas; a case of two areas consisting of "+a* area" and "−a* area" in a*×b* space in the CIE L*a*b* color system, and a case of four areas consisting of "+a*, +b* area", "+a*, −b* area", "−a*, +b* area" and "−a*, −b* area" in the a*×b* area. In addition to that, it is also possible to adopt the XYZ color system (tristimulus) color system and CIE L*u*v* color system as the aforementioned color system. The example of dividing the aforementioned color space into a plurality of areas can include the case of two areas consisting of "+L* area" and "−L* area" in L*×a* space, and the case of four areas consisting of "+L*, +a* area", "+L*, −a* area", "−L*, +a* area" and "−L*, −a* area" in the L*×a* area or the case of eight areas consisting of "+L*, +a*, +b area", "+L*, −a*, +b area", "−L*, +a*, +b area", "−L*, −a*, +b area", "+L*, +a*, −b area", "+L*, −a*, −b area", "−L*, +a*, −b area", and "L −a*, −b area" in the L*×a*×b* space. Incidentally, it is possible to consider that the correction precision of the derided correction formula is improved by increasing the number of the areas obtained by dividing the color space (by dividing the area for each of the measuring points, if possible), but this will increase the load on the processing of correction formula derivation and calculation in the correction formula derivation section 1c and the calculation section 1d of the control server 1. With consideration given to the processing capacity, it is preferred that the number of the areas obtained by dividing the color space be restricted to the appropriate range; for example, the number of the areas should be set to 2 through 8.

In the color control system and its color control method of the aforementioned embodiments, the color chart for colorimeter correction P should be preferably outputted by the DCCP, as described above. In addition, the color chart for colorimeter correction P can be outputted by the outputting apparatus such as a printer and copying machine.

In the color control system and its color control method of the aforementioned embodiments, a plurality of the color chart for colorimeter correction P controlled to have the same color and density are mailed to the colorimeters S1 through S3 arranged at various bases, as described above. In addition, one color chart for colorimeter correction P can be circulated through the colorimeters S1 through S3. Alternatively, one color chart for colorimeter correction P can be circulated through the colorimeters S1 through S3 whenever required, and can be collected later.

According to the color control information providing system and its color control information providing method of the present invention. In addition to the advantages described above, in the control server 1, the difference between:

the corrected value obtained by using the correction formula having the highest correction precision to correct the measured values of the color and density of the output provided by the colorimeter arranged at each base; and the standard values of the color and density of the output provided by the standard colorimeter;

is calculated, based on the standard values of the color and density of the output provided by the standard colorimeter and the measured values of the color and density of the output provided by the colorimeter arranged at each base. The information on this difference is sent to the terminal apparatus installed at each base, as color control information. This arrangement allows the manager to make more detailed control of the difference in measured values provided by the colorimeter installed at each base. At the same time, it allows the user to ensure appropriate calibration of the outputting apparatuses installed at a plurality of bases, by adjusting the outputting apparatuses at each base, according to the color control information.

What is claimed is:

1. A colorimeter measured value control system for detecting errors of measured values of a plurality of colorimeters each arranged for each base, for deriving a correction formula for correcting these errors, and for controlling the measured values of the plurality of colorimeters, said control system comprising:

a plurality of terminal apparatuses, each arranged for each base, each of the plurality of terminal apparatuses having a color sample measured value transmission section for transmitting the measured values of a color sample measured by each of the plurality of colorimeters connected to each of the plurality of terminal apparatuses; and a control server, said control server comprising:

a storage section for storing standard values of the color sample measured by a standard colorimeter, the color sample having been measured by a colorimeter of the plurality of colorimeters;

a reception section for receiving the measured values sent from the color sample measured value transmission section;

a determining section for determining the correction formula to perform corrections of approximating the measured values received by the reception section, to the standard values stored in the storage section; and a correction formula registration section for registering the correction formula determined by the determining section, as the correction formula for correcting the errors of the measured values of the colorimeter having measured the measured values received by the reception section; and a sending section for sending information of the correction formula to a terminal apparatus, which is connected to the colorimeter, of the plurality of terminal apparatuses, wherein the terminal apparatus further comprising:

a receiving section for receiving the information of the correction formula; and a displaying section for displaying the information of the correction formula, wherein the errors of the measured values of the colorimeter, which has measured the color sample, are corrected based on the correction formula.

2. The colorimeter measured value control system of claim 1, wherein the determining section comprises:

a correction formula derivation section for deriving a plurality of correction formulas for performing the correction to approximate the measured values received by the reception section to the standard values stored in the storage section;

a selection section for selecting a correction formula of highest precision among the plurality of correction formulas based on differences between corrected values of the measured values corrected by using the plurality of correction formulas and the standard values stored in the storage section, and for setting this selected formula as a correction formula for correcting the measured values received by the reception section to approximate to the standard values stored in the storage section.

3. The colorimeter measured value control system of claim 2, wherein as the difference between the corrected values of the measured values corrected by using the plurality of correction formulas and the standard values stored in the storage section, the selection section obtains $\Delta E = \{(\Delta L^*)^2 + (\Delta a^*)^2 + (\Delta b^*)^2\}^{1/2}$ in the CIE L*a*b* color system for each of the plurality of correction formulas, and selects a correction formula that minimizes the $\Delta E$ as a correction formula of highest precision.

4. The colorimeter measured value control system of claim 3, wherein the measured values and the standard values being respective measured values at plural measuring points on the color sample, values of the $\Delta E$ obtained for each of the plurality of correction formulas being obtained for each of the plural measuring points, and the selection section selects a correction formula that minimizes an average of values of the $\Delta E$ as the correction formula of highest precision.

5. The colorimeter measured value control system of claim 3, wherein the measured values and the standard values being respective measured values at plural measuring points, values of $\Delta E$ obtained for each of the plurality of correction formulas being obtained for each of the plural measuring points, and the selection section selects the correction formula that minimizes a maximum value of $\Delta E$ as the correction formula of highest precision.

6. The colorimeter measured value control system of claim 2, wherein the correction formula registration section registers the correction formula selected by the selection section, said correction formula expressing the measured values received by the reception section and the standard values stored in the storage section by tristimulous values of X, Y and Z in XYZ color system.

7. A color control system for controlling output colors of a plurality of image output apparatuses arranged at each of a plurality of bases, through deriving a correction formula based on differences between measured values, measured by a plurality of colorimeters, of outputs from a plurality of image output apparatuses and a standard value, said color control system comprising:

a plurality of terminal apparatuses, arranged for each of plural bases, each having a color sample measured value transmission section for transmitting measured values in a predetermined color system measured by each of the plurality of colorimeters at a plurality of measuring points of the color sample; and a control server, said control server comprising:

a storage section for storing standard values in a predetermined color system measured by the standard colorimeter at a plurality of measuring points of the color sample, said color sample having been measured by each of the plurality of colorimeters;

a reception section for receiving the measured values in a predetermined color system at a plurality of measuring points of the color sample sent from the color sample measured value transmission section;

a correction formula derivation section for deriving a plurality of correction formulas to perform corrections of approximating the measured values to the stored standard values for each of classified measured values, wherein a color space in the predetermined color system is divided into a plurality of areas including two areas of "+a* area" and "−a* area"; and four areas of "+a*, +b* area", "+a*, −b* area", "−a*, +b* area" and "−a*, −b* area" in the a* x b* area of the CIE L*a*b* color system, and the received measured values are classified into the plurality of areas, wherein the predetermined color system includes at least one of L*a*b* color system, CIE L*u*v* color system and XYZ tristimulous value color system;

a determining section for determining a correction formula of highest correction precision among the plurality of the correction formulas based on the measured value corrected according to the plurality of correction formulas for each of the classified measured values; and a registration section for registering the correction formula determined above;

wherein measured values of the plurality of colorimeters are corrected based on the correction formula for each of the classified measured values.

8. The color control system of claim 7, wherein the determining section comprises:

a calculating section for calculating color differences between the measured values corrected according to the plurality of correction formulas and the standard values stored; and a selection section for selecting a correction formula that minimizes the color differences among the plurality of correction formulas as the correction formula of highest correction precision.

9. The color control system of claim 8, wherein the calculating section calculates color differences of $\Delta E = \{(\Delta L^*)^2 + (\Delta a^*)^2 + (\Delta b^*)^2\}^{1/2}$ in the CIE L*a*b* color system for each of the plurality of correction formulas as the color differences between the measured values corrected according to the plurality of correction formulas and the standard values stored, and the selection section selects a correction formula that minimizes an average of ΔE values or a maximum of ΔE values, as a correction formula of highest correction precision.

10. The color control system of claim 8, wherein the registration section registers the correction formula selected by the selection section, said correction formula expressing the measured values received by the reception section and the standard values stored in the storage section by tristimulous values of X, Y and Z in XYZ color system.

11. The color control system of claim 7, wherein the control server further comprising:
 a transmission section for transmitting the correction formula registered by the correction formula registration section to a relevant terminal apparatus among the plurality of terminal apparatuses; and
 each of the plurality of terminal apparatuses further comprising:
 a correction formula reception section for receiving the correction formula sent by the transmission section; and
 a display section for displaying the correction formula received by the correction formula receiving section.

12. A colorimeter measured value control method for detecting errors of measured values of a plurality of colorimeters arranged for each of plural bases, for deriving a correction formula for correcting the errors, and for controlling the measured values of the plurality of colorimeters, said control method comprising the steps of:
 storing measured values of a color sample measured by a standard colorimeter as standard values in a control server;
 transmitting measured values of the color sample measured by each of the plurality of colorimeters at each of a plurality of terminal apparatuses arranged for each of plural bases;
 receiving, at the control server, the measured values transmitted by the transmitting step;
 determining a correction formula to perform corrections of approximating the measured values received by the receiving step to the standard values stored; registering the correction formula determined by the determining step;
 transmitting the correction formula to a relevant terminal apparatus among the plurality of terminal apparatuses;
 receiving the correction formula at the relevant terminal apparatus;
 displaying the correction formula at the relevant terminal apparatus; and
 correcting, based on the correction formula, the error of the measured values of the colorimeter having measured the measured values.

13. The colorimeter measured value control method of claim 12, wherein the determining step comprises:
 deriving a plurality of correction formulas for performing corrections to approximate the measured values received by the receiving step to the standard values stored by the storing step; and
 selecting a correction formula of highest precision among the plurality of correction formulas based on differences between corrected values of the measured values corrected by using the plurality of correction formulas and the standard values stored by the storing step, and setting this selected formula as a correction formula for correcting the measured values received by the receiving step to approximate to the standard values stored by the storing step.

14. The colorimeter measured value control method of claim 13, wherein the selecting step comprises:
 obtaining $\Delta E = \{(\Delta L^*)^2 + (\Delta a^*)^2 + (\Delta b^*)^2\}^{1/2}$ in the CIE L*a*b* color system for each of the plurality of correction formulas, as the difference between the corrected values of the measured values corrected by using the plurality of correction formulas and the standard values stored in the storing step; and selecting a correction formula that minimizes the ΔE, as a correction formula of highest precision.

15. The colorimeter measured value control system of claim 14, wherein the measured values and the standard values being respective measured values at plural measuring points on the color sample, values of the ΔE obtained for each of the plurality of correction formulas being obtained for each of the plural measuring points, and in the selecting step a correction formula that minimizes an average of values of the ΔE is selected as the correction formula of highest precision.

16. The colorimeter measured value control method of claim 14, wherein the measured values and the standard values being respective measured values at plural measuring points, values of ΔE obtained for each of the plurality of correction formulas being obtained for each of the plural measuring points, and in the selecting step the correction formula that minimizes a maximum value of ΔE is selected as the correction formula of highest precision.

17. The colorimeter measured value control method of claim 13, wherein in the correction formula registering step, the correction formula selected by the selecting step is registered, said correction formula expressing the measured values received by the receiving step and the standard values stored in the storing step by tristimulous values of X, Y and Z in XYZ color system.

18. A color control method for controlling output colors of a plurality of image output apparatuses arranged at each of plural bases by deriving a correction formula based on differences between measured values, measured by a plurality of colorimeters, of outputs from a plurality of image output apparatus and a standard value, said color control method comprising the steps of:
 transmitting measured values, in a predetermined color system, measured by each of the plurality of colorimeters at a plurality of measuring points of the color sample, from a plurality of terminal apparatuses arranged for each of plural bases; and in a control server, comprising the steps of:
 storing standard values, in a predetermined color system, measured by the standard colorimeter at a plurality of measuring points of the color sample, said color sample having been measured by each of the plurality of colorimeters;
 receiving the measured values in a predetermined color system at a plurality of measuring points of the color sample, transmitted from the plurality of terminal apparatuses;
 deriving a plurality of correction formulas to perform corrections of approximating the measured values to the stored standard values for each of classified measured values, wherein a color space in a predetermined color system is divided into a plurality of areas including two areas of "+a* area" and "−a* area"; and four areas of "+a*, +b* area", "+a*, −b* area", "−a*, +b* area" and "−a*, −b*, area" in the a*×b* area of the CIE L*a*b* color system, and the received measured values are classified into the plurality of areas, wherein the predetermined color system includes at least one of CIE L*a*b* color system, CIE L*u*v* color system and XYZ tristimulous value color system;

determining a correction formula of highest correction precision among the plurality of the correction formulas based on the measured values corrected according to the plurality of correction formulas for each of the classified measured values;

registering the correction formula determined by the determined step; and correcting, based on the correction formula, the error of measured values for each of the classified measured values of the colorimeter having measured the measured values received by the receiving step.

19. The color control method of claim 18, wherein the determining step comprises:

calculating color differences between the corrected measured values corrected according to the plurality of correction formulas and the standard values stored; and selecting a correction formula that minimizes the color differences among the plurality of correction formulas as the correction formula of highest correction precision.

20. The color control method of claim 19, wherein the calculating step comprises:

calculating color differences of $\Delta E = \{(\Delta L^*)^2 + (\Delta a^*)^2 + (\Delta b^*)^2\}^{1/2}$ in the CIE L*a*b* color system for each of the plurality of correction formulas as the color difference between the measured values corrected according to the plurality of correction formulas and the standard values stored; and the selecting step comprises:

selecting a correction formula that minimizes an average of $\Delta E$ values or a maximum of $\Delta E$ values, as the correction formula of highest correction precision.

21. The color control method of claim 19, wherein the registering step comprises:

registering the correction formula selected by the selecting step, said correction formula expressing the measured values received and the standard values stored by tristiculous values of X, Y and Z in XYZ color system.

22. The color control method of claim 18, in the control server, further comprising the step of:

transmitting the correction formula registered by the registering step to a relevant terminal apparatus among the plurality of terminal apparatuses; and in each of the plurality of terminal apparatuses further comprising the steps of:

receiving the correction formula transmitted; and displaying the correction formula received.

23. A color control information providing system to calibrate a plurality of image outputting apparatuses each arranged for each of plural bases; said system detecting errors of measured values of a plurality of colorimeters each arranged on each of plural bases to measure outputs produced from the plurality of image outputting apparatuses; deriving a correction formula for correcting the errors; correcting the measured values by using the correction formula; calculating the errors, among the plural bases, of the measured values of the outputs produced from the image outputting apparatus, based on the corrected measured values; and providing the results of the calculation; said system comprising:

a plurality of terminal apparatuses, each arranged for each of plural bases, each comprising:

a measured value transmission section for transmitting a measured value of an output measured by each of the plurality of colorimeters and for transmitting a measured value of a color sample measured by each of the plurality of colorimeters; and a control server, said control server comprising:

a measured value storage section for storing a measured value of the output measured by a standard colorimeter, as a standard output value and for storing a measured value of the color sample measured by the standard colorimeter, as a standard color sample value;

a measured value reception section for receiving the measured value of the output transmitted from the measured value transmission section and for receiving the measured value of the color sample transmitted from transmission section;

a determining section for determining the correction formula to perform corrections of approximating the measured value of the color sample received by the measured value reception section, to the standard color sample value stored in the measured value storage section;

a correction formula registration section for registering the correction formula determined by the determining section, as the correction formula for correcting the error of the measured value of the colorimeter, which having measured the value of the color sample received by the measured value reception section;

a calculation section for calculating an error, which is a difference between the measured value of the output received by the output measured value reception section and corrected by the correction formula registered by the correction formula registration section, and the standard output value stored in the measured value storage section; and an error registration section for registering the error calculated by the calculation section, as an error among plural bases, of the measured values of the output measured by each of the plurality of colorimeters, wherein outputs from the plurality of image outputting apparatus are adjusted based on the error registered.

24. The color control information providing system of claim 23, wherein the determining section comprises:

a correction formula derivation section for deriving a plurality of correction formulas for performing the correction to approximate the measured values received by the reception section to the standard values stored in the storage section;

a selection section for selecting a correction formula of highest precision among the plurality of correction formulas based on differences between corrected values of the measured values corrected by using the plurality of correction formulas and the standard values stored in the storage section, and for setting this selected formula as a correction formula for correcting the measured values received by the reception section to approximate to the standard values stored in the storage section.

25. The color control information providing system of claim 24, wherein as the difference between the corrected values of the measured values corrected by using the plurality of correction formulas and the standard values stored in the storage section, the selection section obtains $\Delta E = \{(\Delta L^*)^2 + (\Delta a^*)^2 + (\Delta b^*)^2\}^{1/2}$ in the CIE L*a*b* color system for each of the plurality of correction formulas, and selects a correction formula that minimizes the $\Delta E$ as a correction formula of highest precision.

26. The color control information providing system of claim 25, wherein the measured values and the standard values being respective measured values at plural measuring points on the color sample, values of the ΔE obtained for each of the plurality of correction formulas being obtained for each of the plural measuring points, and the selection section selects a correction formula that minimizes an average of values of the ΔE as a correction formula of highest precision.

27. The color control information providing system of claim 25, wherein the measured values and the standard values being respective measured values at plural measuring points, values of ΔE obtained for each of the plurality of correction formulas being obtained for each of the plural measuring points, and the selection section selects a correction formula that minimizes a maximum value of ΔE as a correction formula of highest precision.

28. The color control information providing system of claim 24, wherein the correction formula registration section registers the correction formula selected by the selection section, said correction formula expressing the measured values received by the reception section and the standard values stored in the storage section by tristimulous values of X, Y and Z in XYZ color system.

29. The color control information providing system of claim 23, wherein the control server further comprises a transmission section for transmitting a correction formula registered by the correction formula registration section to a relevant terminal apparatus among the plurality of terminal apparatuses, and
each of the plurality of terminal apparatuses further comprising:
a correction formula reception section for receiving the correction formula sent by the transmission section; and
a display section for displaying the correction formula received by the correction formula receiving section.

30. The color control information providing system of claim 23, wherein the control server further comprises a transmission section for transmitting the error registered by the error registration section to a relevant terminal apparatus among the plurality of terminal apparatuses, and
each of the plurality of terminal apparatuses further comprises:
an error reception section for receiving the error sent by the transmission section; and
an error display section for displaying the error received by the correction formula receiving section.

31. A color control information providing method to calibrate a plurality of image outputting apparatuses each arranged for each of plural bases; said system detecting errors of measured values of a plurality of colorimeters each arranged on each of plural bases to measure outputs produced from the plurality of image outputting apparatuses; deriving a correction formula for correcting the errors; correcting the measured values by using the correction formula; calculating the errors, among the plural bases, of the measured values of the outputs produced from the image outputting apparatus, based on the corrected measured values; and providing the results of the calculation; said method comprising the steps of:
storing a measured value of the output measured by a standard colorimeter, as a standard value, in the control server;
storing the measured value of the color sample measured by the standard colorimeter, as a standard value, in the control server;
receiving the measured value of the color sample transmitted, at the control server;
determining the correction formula to perform corrections of approximating the measured value of the color sample received to the standard measured value of the color sample stored;
registering the correction formula determined by the determining section, as the correction formula for correcting the error of the measured value of the colorimeter, which measured the color sample;
transmitting the measured value of the output measured by each of the plurality of colorimeters from each of the plurality of terminal apparatuses;
receiving the measured value of the output transmitted, at the control server;
calculating the difference between the measured value of the output received, corrected by the correction formula registered, and the standard value of the output stored; and
registering the error calculated, as an error among plural bases, of the measured values of the output measured by each of the plurality of colorimeters; and
adjusting outputs from the plurality of image outputting apparatuses based on the error registered.

32. The color control information providing method of claim 31, wherein the determining step comprises:
deriving a plurality of correction formulas for performing corrections to approximate the measured values received by the receiving step to the standard values stored by the storing step; and
selecting a correction formula of highest precision among the plurality of correction formulas based on differences between corrected values of the measured values corrected by using the plurality of correction formulas and the standard values stored by the storing step, and setting this selected formula as a correction formula for correcting the measured values received by the receiving step to approximate to the standard values stored by the storing step.

33. The color control information providing method of claim 32, wherein the selecting step comprises:
obtaining $\Delta E=\{(\Delta L^*)^2+(\Delta a^*)^2+(\Delta b^*)^2\}^{1/2}$ in the GIE L*a*b* color system for each of the plurality of correction formulas, as the difference between the corrected values of the measured values corrected by using the plurality of correction formulas and the standard values stored in the storing step; and
selecting a correction formula that minimizes the ΔE, as a correction formula of highest precision.

34. The color control information providing method of claim 33, wherein the measured values and the standard values being respective measured values at plural measuring points on the color sample, values of the ΔE obtained for each of the plurality of correction formulas being obtained for each of the plural measuring points, and in the selecting step a correction formula that minimizes an average of values of the ΔE is selected as the correction formula of highest precision.

35. The color control information providing method of claim 33, wherein the measured values and the standard values being respective measured values at plural measuring points, values of ΔE obtained for each of the plurality of correction formulas being obtained for each of the plural measuring points, and in the selecting step the correction formula that minimizes a maximum value of ΔE is selected as the correction formula of the highest precision.

36. The color control information providing method of claim 32, wherein in the correction formula registering step, the correction formula selected by the selecting step is registered, said correction formula expressing the measured values received by the receiving step and the standard values stored in the storing step by tristimulous values of X, Y and Z in XYZ color system.

37. The color control information providing method of claim 21, in the control server, further comprising the steps of:
transmitting a correction formula registered by the correction formula registering step to a relevant terminal apparatus among the plurality of terminal apparatuses; and
comprising in each of the plurality of terminal apparatuses:
receiving the correction formula transmitted by the transmitting step; and
displaying the correction formula received by the correction formula receiving step.

38. The color control information providing method of claim 21, in the control server, further comprising the steps of:
transmitting the error registered by the correction formula registering step to a relevant terminal apparatus among the plurality of terminal apparatuses; and comprising in each of the plurality of terminal apparatuses:
receiving the error transmitted by the transmitting step; and
displaying the error received by the error receiving step.

* * * * *